United States Patent
Mitani

(10) Patent No.: US 6,914,692 B1
(45) Date of Patent: Jul. 5, 2005

(54) PRINTING CONTROL APPARATUS, DATA PROCESSING METHOD FOR PRINTING CONTROL APPARATUS, AND STORAGE MEDIUM STORING COMPUTER-READABLE PROGRAM

(75) Inventor: Keisuke Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/516,111

(22) Filed: Mar. 1, 2000

(30) Foreign Application Priority Data

Mar. 1, 1999 (JP) .............................. 11-052976
Feb. 28, 2000 (JP) ....................... 2000-051099

(51) Int. Cl.⁷ ............................. G06F 3/12; G06F 13/00
(52) U.S. Cl. ...................... 358/1.15; 358/1.9; 358/1.17
(58) Field of Search .............................. 358/1.15, 1.9, 358/1.4, 1.14, 1.16, 1.17, 524, 530, 539, 540, 2.1, 3.12, 3.23, 3.28, 504, 528, 426.06

(56) References Cited

U.S. PATENT DOCUMENTS

| | | | | |
|---|---|---|---|---|
| 5,768,489 A | * | 6/1998 | Adachi et al. | ............. 358/1.18 |
| 6,100,998 A | * | 8/2000 | Nagao et al. | ................ 358/1.9 |
| 6,559,971 B1 | * | 5/2003 | Watts et al. | ................ 358/1.2 |

* cited by examiner

Primary Examiner—Douglas Tran
(74) Attorney, Agent, or Firm—Fitzpatrick, Cella, Harper & Scinto

(57) ABSTRACT

A printing control apparatus of the present invention uses plural expansion processing units which expand printing data of a predetermined format to image data of a format to be output to a printer, by a segment. Before expansion processing to the printing data of one page is performed, a processing time necessary to expand the printing data to the image data is calculated for each segment. The expansion processing for each segment by the plural expansion processing units is scheduled based on the calculated processing time.

15 Claims, 18 Drawing Sheets

FIG. 18

| BD | RENDERING TIME | TSL 1 | ... | TSL 2 | ... | TSL 3 | ... | TSL 4 | ... | TSL 5 |
|---|---|---|---|---|---|---|---|---|---|---|
| BAND B1 | 0.6 | 613 | ... | 613 | ... | 613 | ... | 613 | ... | 613 |
| BAND B2 | 1.0 | 614 | ... | 614 | ... | 614 | ... | 614 | ... | 610 |
| BAND B3 | 1.8 | *1 | ... | *1 | ... | *1 | ... | *1 | ... | -1#2 |
| BAND B4 | 1.2 | 613 | ... | 613 | ... | 613 | ... | 613 | ... | 613 |
| BAND B5 | 3.2 | *2 | ... | *2 | ... | *2 | ... | 610 | ... | 611 |
| BAND B6 | 1.6 | *3 | ... | *3 | ... | 614 | ... | 614 | ... | 614 |
| BAND B7 | 2.2 | *4 | ... | 614 | ... | 610 | ... | 611 | ... | 610 |
| TBN | — | 4 | ... | 3 | ... | 2 | ... | 1 | ... | 0 |

FIG. 19

SCHEDULE LIST

| RENDERING UNIT 68 | | RENDERING UNIT 67 | |
|---|---|---|---|
| BAND B1 | 613 | BAND B2 | 610 |
| BAND B3 | 614 | BAND B5 | 611 |
| BAND B4 | 613 | BAND B7 | 610 |
| BAND B6 | 614 | — | — |

FIG. 22
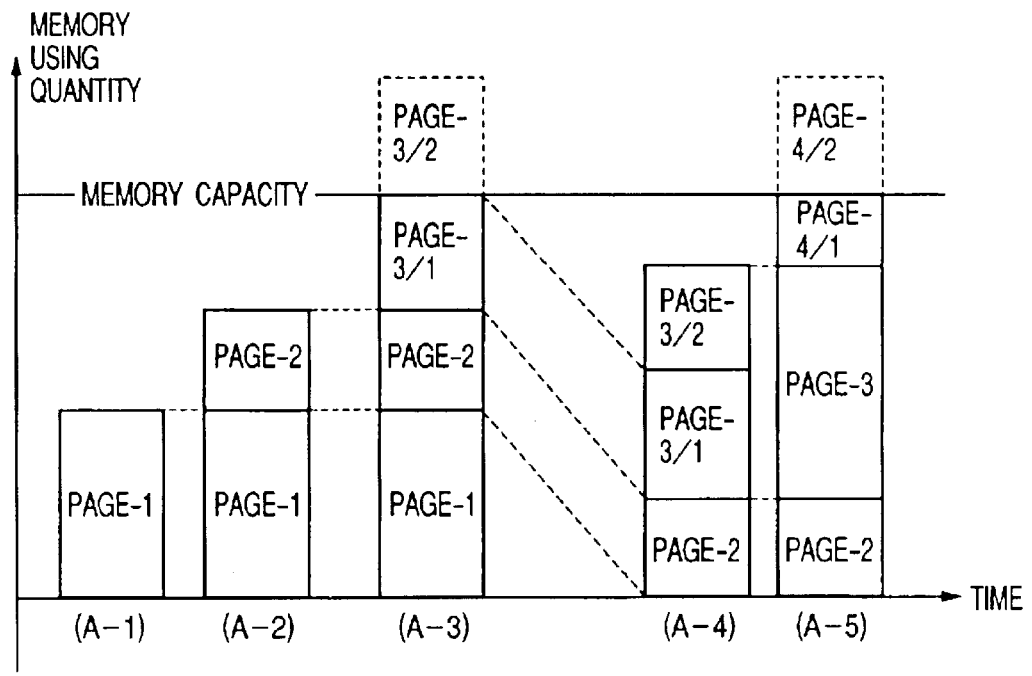
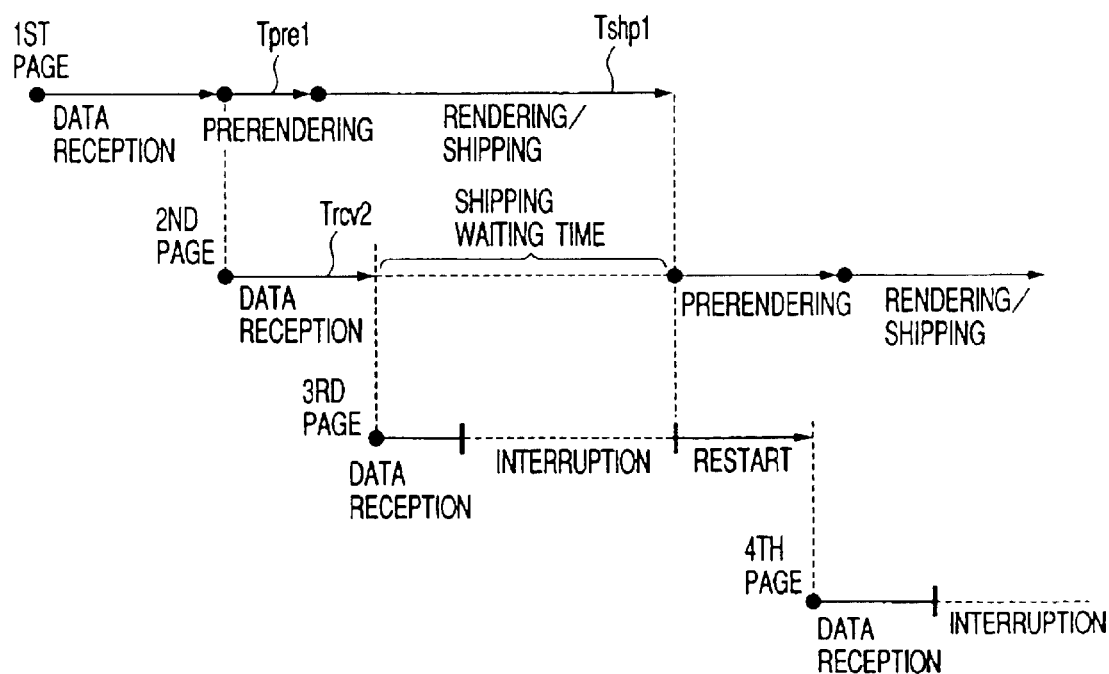

PRINTING CONTROL APPARATUS, DATA PROCESSING METHOD FOR PRINTING CONTROL APPARATUS, AND STORAGE MEDIUM STORING COMPUTER-READABLE PROGRAM

BACKGROUND OF THE INVENTION

1. Field of the Invention

The present invention relates to a printing control apparatus, a data processing method for the printing control apparatus, and a storage medium which stores a program readable by a computer.

2. Related Background Art

Conventionally, a printer of type in which data (printing data) concerning printing contents and a printing format is received from a host computer or the like, a bit map to be actually output is formed based on the received data (this operation is called "rendering" hereinafter), and the formed bit map is output to a printing unit (this operation is called "shipping" hereinafter) has been widely put to practical use.

As this type of the printer, there is the printer of type in which the output bit map of one page is obtained by the rendering, and then the shipping is performed. In this case, since a memory for holding the bit map of one page is always necessary, the capacity of the memory must be increased in the printer or the like of which output resolution is high, whereby memory efficiency is lowered, and the apparatus itself becomes extremely expensive.

Thus, the printer of type in which one page is sectioned by a smaller segment unit (band), the shipping is performed after the rendering of one band ends, and the rendering of next band is performed in parallel with the previous shipping (called banding processing) is thought. However, when the bit map is output to an printing unit such as an electrophotographic printing unit which can not stop printing during one page, if a rendering time for the next band becomes longer than a parallel shipping time for the previous band, there is a problem such as causing a phenomenon that a normal image can not be printed (this phenomenon is called "printing overrun" hereinafter).

As above, in such a conventional printing processing system, there is a problem that normal printing and outputting are impossible due to the printing overrun.

An example of a method to solve the above problem will be explained with reference to FIGS. 20 and 21.

FIG. 20 is a block diagram for explaining a structure of a data processing unit of a printing control apparatus to which such the method is applied. Printing data which is received by a host computer 41 through a reception unit 42 is converted by an intermediate data generation unit 43 into a format (i.e., intermediate data) which can be easily processed by a printer. The converted intermediate data is stored in an intermediate data storage area 44. Numeral 47 denotes a vacant memory.

Here, the intermediate data is divided by a band unit and then stored in the intermediate data storage area 44 such that the rendering can be performed to each band later. After the printing data of one page is stored as the intermediate data in the intermediate data storage area 44, the stored data is subjected to the rendering by a rendering unit 48 to obtain an output image, and then the shipping is performed to send the output image to an output unit 411.

It should be noted that, as the feature of the printing control apparatus, temporary band rasters 45 and 46 are secured on memory resources.

Here, the rendering is performed for each band, and thus obtained output image is stored in plural band rasters 49 and 410. Timing of the operation is as follows. Namely, while the output image for one band already subjected to the rendering and stored in the band raster 49 is subjected to the shipping to the output unit 411, the output image for another band is subjected to the rendering by the rendering unit 48 and stored in the band raster 410. On the other hand, while the output image stored in the band raster 410 is subjected to the shipping, the output image for another band is subjected to the rendering and stored in the band raster 49. Namely, as above, the rendering and the shipping are alternately performed.

Here, in the output unit (a shipping unit) 411 of a general electrophotographic printer such as a laser beam printer or the like, a speed of the shipping for one page is constant from its head to its end, and the shipping can not often be stopped during one page. There is some fear that such the printer causes the above printing overrun phenomenon.

FIG. 21 is a timing chart for explaining a printing data processing state in the printing control apparatus of FIG. 20. In FIG. 21, the vertical axis represents a time axis, and the processing operations of the rendering unit 48, the band rasters 49 and 410 and the output unit 411 are shown according to the passage of time.

In FIG. 21, numerals 5-1 to 5-5 respectively denote bands B1 to B5 which are subjected to the rendering by the rendering unit 48, numerals 5-6 to 5-8 denote output images which are stored in the band raster 49, and numerals 5-9 and 5-10 denote output images which are stored in the band raster 410. The output images 5-6, 5-7, 5-8, 5-9 and 5-10 correspond to the bands B1, B4, B7, B2 and B5, respectively.

Numeral 5-13 to 5-19 denotes bands which are subjected to the shipping at the output unit 411. As previously described, the shipping for each band in the printer is not interrupted on the way (i.e., continued), and the shipping processing time for each band is identical with others. Hereinafter, the flow of the printing processing will be explained along the time axis shown in FIG. 21.

The bands B3, B5, B6 and B7 are the bands (i.e., the band causing the printing overrun) to which, e.g., the complicated rendering is necessary. Namely, since it takes long time for the rendering of these bands, the rendering does not end only by the ordinary band processing when the shipping starts.

In order to prevent the printing overrun in the printing control apparatus, the temporary band rasters 45 and 46 are secured, and the rendering is previously (i.e., before a time t0 of FIG. 2) performed to obtain output images 5-11 and 5-12 respectively for the bands B3 and B6 (this operation is called "prerendering" hereinafter).

The band B1 (band 5-1) at the head of the page is subjected to the rendering at the time t0 to a time t1 by the rendering unit 48, and the obtained output image 5-6 is stored in the band raster 49.

Then the band B1 (band 5-13) is subjected to the shipping at the time t1 to a time t2 by the output unit 411, and at the same time the rendering of the band B2 (band 5-2) by the rendering unit 48 starts at the time t1. The obtained output image 5-9 is stored in the band raster 410.

Since the band B3 was already subjected to the rendering and has been held as the output image 5-11 in the temporary band raster 45, the rendering unit 48 performs the rendering to the band B4 (bands 5-3 and 57) at the time t2 when the shipping from the band raster 49 ends. In the shipping (band 5-15) of the band B3 at a time t3, the output image 5-11 already subjected to the rendering is used, the printing overrun does not occur.

At the time t3 when the shipping of the band B2 (band output 5-14) ends, since the rendering of the band B4 (band 5-3) to the band raster 49 has ended, the rendering unit 48 can start the rendering of the band B5 (bands 5-4 and 5-10) to the band raster 410.

When the shipping of the band B4 (bands 5-3 and 57) ends at a time t4 to a time t5 (band 5-16), the shipping of the band B5 (bands 5-4 and 5-10) to the output unit 411 starts (band 5-17). As described above, the time necessary for the rendering of the band B5 exceeds the shipping time of one band. However, since the rendering of the band B5 starts at the time t3, the rendering of the band B5 can end until the time t5 when the shipping of the band B5 starts, whereby the printing overrun does not occur.

Further, since the band B6 is subjected to the rendering and held in the temporary band raster 46 (band 5-12) before the shipping, the printing overrun does not occur (band 5-18). Further, although the rendering time for the band B7 (band 5-5) is long (band 5-8), since the rendering starts at the time t5, the rendering ends before shipping start timing (time t7) of the band B7, whereby the printing overrun does not occur even in the band B7 (band 5-19).

Thus, in the above printing control apparatus, after the prerendering is performed to the temporary band raster, the rendering and the shipping are performed in parallel by using the plural band rasters.

It should be noted that the band rasters 49 and 410 are the areas which are permanently secured in the printer because they are used for any page, while the temporary band rasters 45 and 46 are the areas which are temporarily secured by only necessary number for the necessary page. For this reason, in the printing control apparatus, the temporary band raster is secured in the same memory area as the intermediate data storage area 44, and the secured temporary band raster is deleted from the memory resources after the shipping of the page ends.

By such a method as above, all the pages can be printed and output without causing any printing overrun.

However, according to technological advancement such as colorization, making to multivalue, and making to high resolution in recent years, a rendering time has become longer, and a band raster size necessary for one band has become larger. Thus, the total quantity (i.e., the number) of the temporary band rasters necessary for preventing the printing overrun has become huge even in such the method.

Further, in the above printer, a printing procedure for one page can be roughly divided into following three steps.

First, in a data reception step (first step), the printing data of one page is received and stored in the memory of the printer. In a second step, the prerendering is performed to the band raster and the temporary band raster before the rendering and the shipping are performed. In a rendering/shipping step (third step), as the shipping is performed from the band raster already subjected to the rendering, the rendering of the band not yet subjected to the rendering is performed to the vacant band raster.

The relation of these steps and the memory capacity in the printer in case of printing the plural pages will be explained with reference to FIG. 22.

FIG. 22 is a view for explaining a memory using state in the printing control apparatus. In FIG. 22, the vertical axis represents a memory using quantity, the horizontal axis represents a time, and the vertical length of the memory using quantity represents the size of the printing data in the memory.

Further, in FIG. 22, the arrows which are parallel with the time axis represent the states of the above three steps (i.e., data reception, prerendering and rendering/shipping) for the first to fourth pages to be printed.

In FIG. 22, the first page is formed in a time (A1), the second page is formed in a time (A-2), the third page is formed in a time (A-3) to a time (A-4), and the fourth page is formed in a time (A-5).

The printing data of the first page is larger in size than the printing data of the second page.

First, in the time (A-1), the printing data of the first page is received and stored in the memory. Of course, the printing data can be stored in the form of intermediate data. After the printing data of the first page is stored in the memory entirely, the printing data of the second page is received and stored in the memory in the time (A-2).

The rendering unit 48 performs the prerendering to the band raster according to the already-received data of the first page, in parallel with the reception of the printing data of the second page.

After the prerendering for the first page ends, the rendering by the rendering unit 48 and the shipping are performed in parallel, and the data of the first page is output to a sheet.

Meanwhile, in the time (A-3), after the printing data reception of the second page ends, the printing data reception of the third page starts.

However, all the printing data of the first to third pages can not be stored in the entire memory of the printing control apparatus in this example. Namely, the entire memory is completely used in the middle of the data storage of the third page.

Thus, the data reception of the third page is interrupted. Then, after the rendering/shipping for the first page ends, the printing data of the first page in the memory already unnecessary because of the printing end of the first page is deleted to secure the storage area for the remaining printing data of the third page.

After then, in the time (A-4), the remaining printing data of the third page is stored in the memory, and at the same time the printing data of the second page already received is subjected to the rendering by the rendering unit 48.

After the printing data reception of the third page ends, the printing data of the fourth page is received in the time (A-5).

Also, in this case, the printing data of the fourth page can not be stored in the memory entirely, whereby the data reception is interrupted.

Further, after the prerendering for the second page ends, the rendering unit subsequently starts the rendering/shipping for the second page. The, after the rendering/shipping for the second page ends, the printing data reception of the fourth page is restarted.

As above, in case of printing the plural pages in the limited memory resources, the printing data reception waits for the rendering/shipping. In this connection, since a shipping speed is extremely lower than a printing data transfer speed, it is an unavoidable loss of the processing time to wait for the shipping as long as the memory resources are limited.

Here, the sum of the printing data and the temporary raster for preventing the printing overrun corresponds to the size of each page. Thus, when there are a lot of pages to which it takes the rendering time due to the complicated rendering or the like, since the size of the band raster is large, there is a problem that a frequency of the shipping waiting increases.

Incidentally, the loss time due to the shipping waiting is proportional to the sum of the prerendering time and the rendering/shipping time.

For example, it is assumed that the prerendering time for the first page is Tprel, the rendering/shipping time for the first page is Tshpl (constant), and the data reception time for the second page is Trcv2. In this case, the shipping waiting time for the second page in FIG. 22 is given by the expression Tprel+Tshpl−Trcv2. Since the rendering/shipping time Tshpl is constant, it can be understood that the shipping waiting time is significantly influenced by the prerendering time Tprel.

Therefore, when there are a lot of pages to which the complicated rendering is necessary, since a prerendering time to eliminate the printing overrun is prolonged, the shipping waiting time is resultingly prolonged (i.e., thruput decreases).

As above, according to the conventional printing overrun elimination method, although the printing overrun can be eliminated, the shipping waiting time becomes long, whereby there is resultingly a problem that performance of the entire printer remarkably decreases.

SUMMARY OF THE INVENTION

An object of the present invention is to solve the above-described problems.

Another object of the present invention is to provide a printing control apparatus which can optimally schedule expansion processing in plural expansion processing means, a data processing method for the printing control apparatus, and a storage medium which stores a computer-readable program.

Still another object of the present invention is to provide a printing control apparatus which can eliminate occurrence of overrun without greatly increasing a necessary memory capacity, a data processing method for the printing control apparatus, and a storage medium which stores a computer-readable program.

Still another object of the present invention is to provide a printing control apparatus which can restrain lowering of performance of a printer and also eliminate occurrence of overrun, a data processing method for the printing control apparatus, and a storage medium which stores a computer-readable program.

Still another object of the present invention is to provide a printing control apparatus which can, even in a case where there are a lot of pages to which complicated rendering is necessary, restrain lowering of performance of a printer and also eliminate occurrence of overrun without greatly increasing a necessary memory capacity, a data processing method for the printing control apparatus, and a storage medium which stores a computer-readable program.

Still another object of the present invention is to provide a printing control apparatus which can effectively use memory resources, a data processing method for the printing control apparatus, and a storage medium which stores a computer-readable program.

In order to achieve the above-described objects, an printing control apparatus according to the present invention is featured by comprising:

plural expansion processing means for expanding printing data of a predetermined format to image data of a format to be output to a printer, by a segment;

a calculation means for calculating, before the expansion processing is performed by the expansion processing means, a processing time necessary to expand the printing data to the image data for each segment; and a scheduling processing means for scheduling the expansion processing for each segment by the plural expansion processing means, based on the time calculated by the calculation means.

Preferably, the printing control apparatus is featured by further comprising a transfer means for transferring the expanded image data to the printer, and that the scheduling processing means further comprises a judgment means for judging for each segment whether or not the expansion processing is to be performed by the expansion processing means before the transfer of the image data is started, based on the time calculated by the calculation means.

Preferably, the printing control apparatus is featured by further comprising a compression means for compressing the expanded image data for the segment to which it was judged by the judgment means that the expansion processing is to be performed by the expansion processing means before the transfer of the image data is started.

Preferably, the printing control apparatus is featured by further comprising:

a reception means for receiving output data from a data processing apparatus; and a conversion means for converting the received data into the printing data of the predetermined format.

Preferably, the printing control apparatus is featured that the printing data of the predetermined format is intermediate data of a format classified for each band.

Besides, in order to achieve the above-described objects, a data processing method for an printing control apparatus according to the present invention is featured by comprising:

an expansion processing step of expanding, by using plural expansion processing means, printing data of a predetermined format to image data of a format to be output to a printer, by a segment;

a calculation step of calculating, before the expansion processing is performed by the expansion processing means, a processing time necessary to expand the printing data to the image data for each segment; and a scheduling processing step of scheduling the expansion processing for each segment by the plural expansion processing means, based on the time calculated in the calculation step.

Preferably, the data processing method is featured by further comprising a transfer step of transferring the expanded image data to the printer, and that the scheduling processing step further comprises a judgment step of judging for each segment whether or not the expansion processing is to be performed in the expansion processing step before the transfer of the image data is started, based on the time calculated in the calculation step.

Preferably, the data processing method is featured by further comprising a compression step of compressing the expanded image data for the segment to which it was judged in the judgment step that the expansion processing is to be performed in the expansion processing step before the transfer of the image data is started.

Preferably, the data processing method is featured by further comprising:

a reception step of receiving output data from a data processing apparatus; and a conversion step of converting the received data into the printing data of the predetermined format.

Preferably, the data processing method is featured that the printing data of the predetermined format is intermediate data of a format classified for each band.

Besides, in order to achieve the above-described objects, a storage medium according to the present invention is featured to store a computer-readable program to execute:

an expansion processing step of expanding, by using plural expansion processing means, printing data of a predetermined format to image data of a format to be output to a printer, by a segment;

a calculation step of calculating, before the expansion processing is performed by the expansion processing means, a processing time necessary to expand the printing data to the image data for each segment; and a scheduling processing step of scheduling the expansion processing for each segment by the plural expansion processing means, based on the time calculated in the calculation step.

Preferably, the storage medium is featured to further store a computer-readable program to execute a transfer step of transferring the expanded image data to the printer, and wherein the scheduling processing step comprises a judgment step of judging for each segment whether or not the expansion processing is to be performed in the expansion processing step before the transfer of the image data is started, based on the time calculated in the calculation step.

Preferably, the storage medium is featured to further store a program to execute a compression step of compressing the expanded image data for the segment to which it was judged that the expansion processing is to be performed in the expansion processing step before the transfer of the image data is started.

Preferably, the storage medium is featured to further store a program to execute:

a reception step of receiving output data from a data processing apparatus; and a conversion step of converting the received data into the printing data of the predetermined format.

Preferably, the storage medium is featured to store the program to perform the processing wherein the printing data of the predetermined format is intermediate data of a format classified for each band.

According to the present invention, it is possible to solve a problem that, although printing overrun can be eliminated, a shipping waiting time becomes long, whereby resultingly performance of an entire printer remarkably decreases.

Further, according to the present invention, it is possible to optimally schedule expansion processing in plural expansion processing means.

Further, according to the present invention, it is possible to eliminate overrun without greatly increasing a necessary memory capacity.

Further, according to the present invention, it is possible to restrain lowering of performance of a printer and also eliminate occurrence of overrun.

Further, according to the present invention, even in a case where there are a lot of pages to which complicated rendering is necessary, it is possible to restrain lowering of performance of a printer and also eliminate occurrence of overrun without greatly increasing a necessary memory capacity.

Further, according to the present invention, it is possible to effectively use memory resources.

Further, according to the present invention, plural expansion processing means can allot image expansion processing of each band to others according to an optimized banding schedule, whereby it is possible to minimize a necessary quantity of temporary band rasters to be secured in memory resources and also eliminate occurrence of overrun.

As above, according to the present invention, even if an object which prolongs band expansion processing is included, it is possible to achieve the significant effects for transferring an expanded bit map image to a printer while eliminating band overrun, and for effectively using memory resources without greatly increasing a quantity of temporary band rasters to be secured in memory resources at a band expansion processing time.

Other objects and features of the present invention will become apparent from the following detailed description and the attached drawings.

BRIEF DESCRIPTION OF THE DRAWINGS

FIG. 18 is a view for explaining an example of the data processing state in the printing control apparatus according to the present invention;

FIG. 19 is a view showing a schedule list in the example shown in FIG. 18;

FIG. 22 is a view for explaining a memory using state in the printing control apparatus of FIG. 20.

DETAILED DESCRIPTION OF THE PREFERRED EMBODIMENTS

Hereinafter, the preferred embodiments of the present invention will be explained in detail with reference to the attached drawings.

(First Embodiment)

Figure 1:
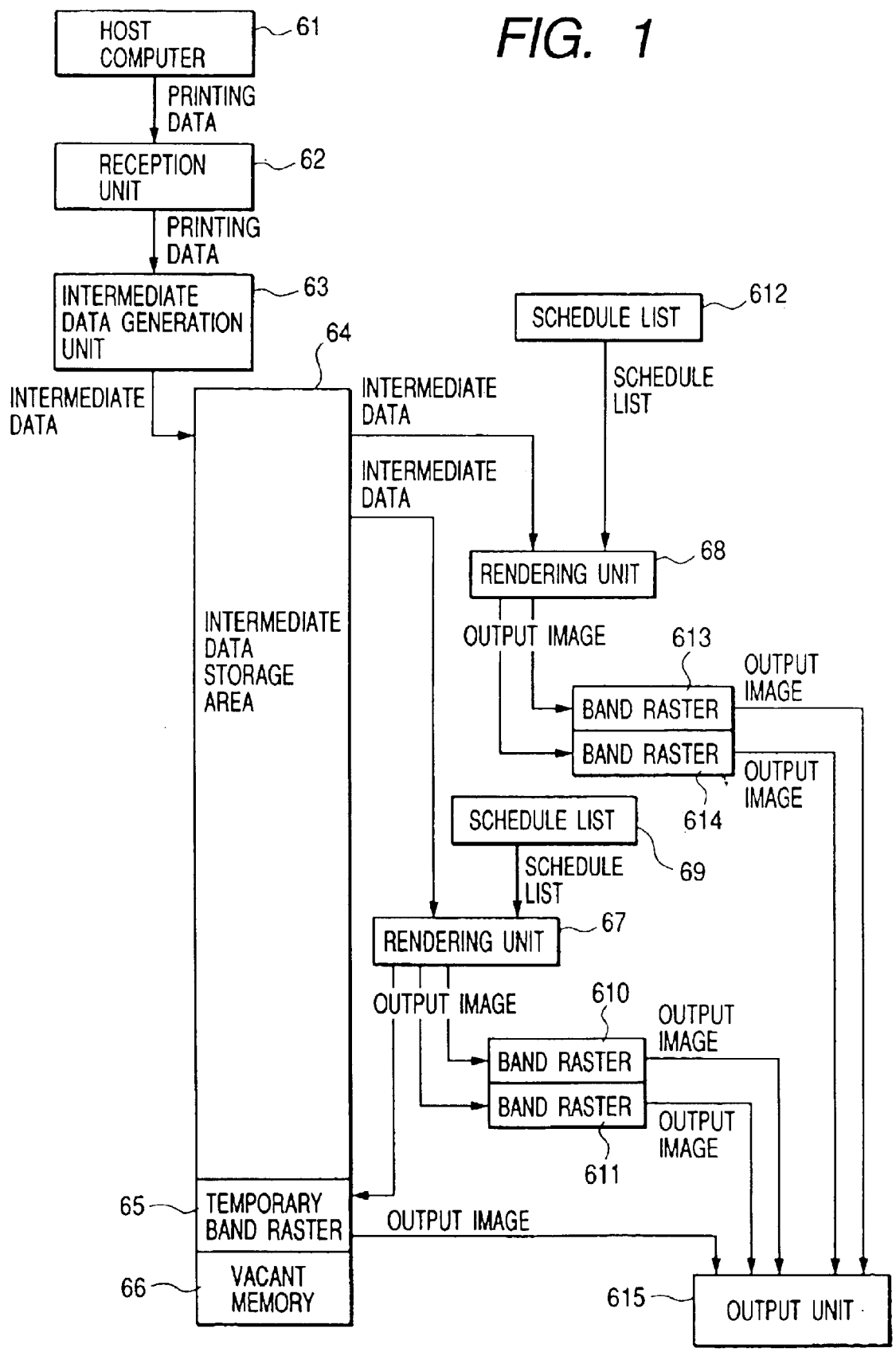
FIG. 1 is a block diagram for explaining a data processing state of a printing control apparatus according to the first embodiment.

FIG. 1 is a block diagram for explaining a data processing state of a printing control apparatus according to the present embodiment. The data processing state corresponds to a data flow from printing data reception from a host computer 61 to shipping of the data to an output unit 615.

Figure 20:
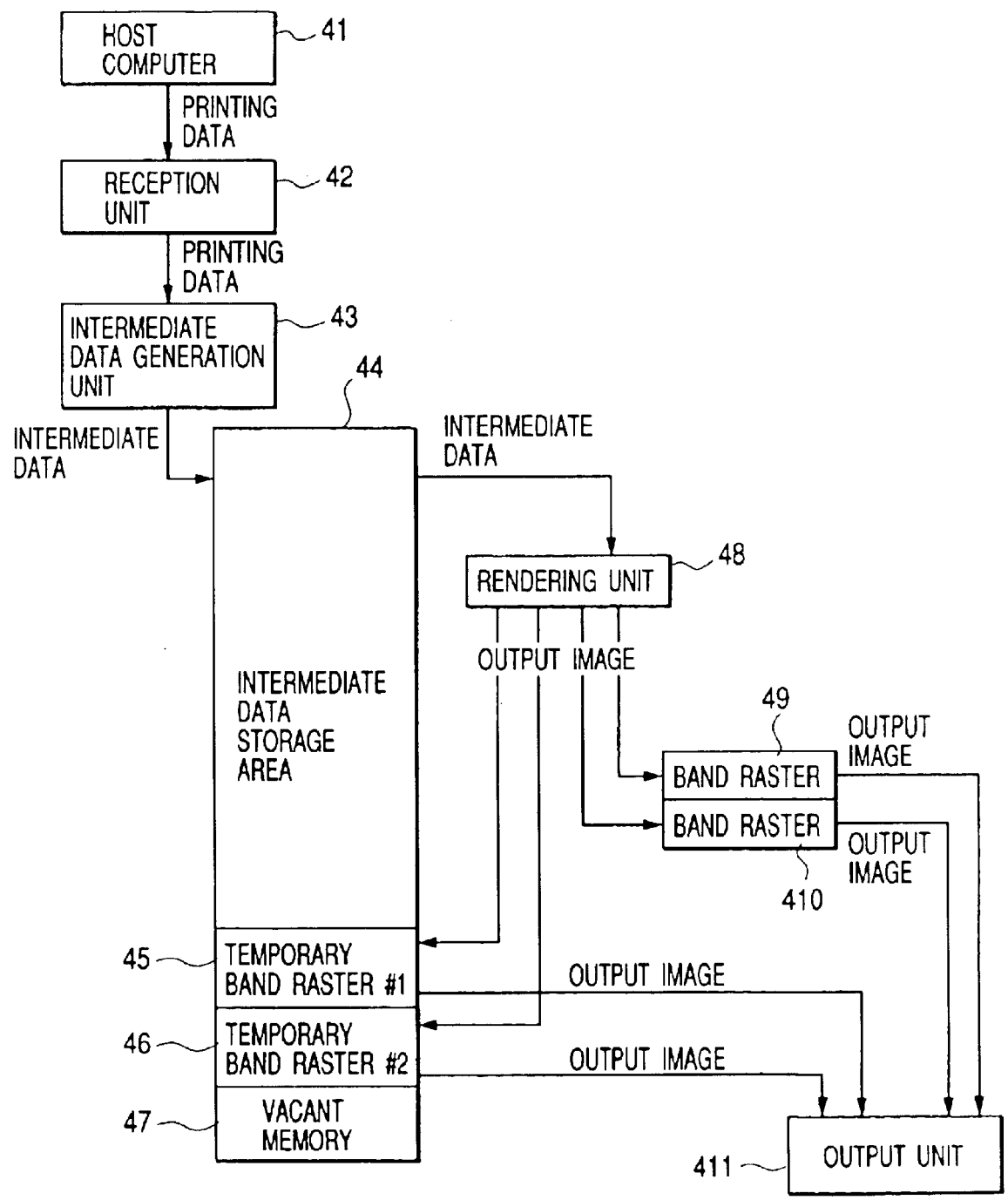
FIG. 20 is a block diagram for explaining a structure of a printing control apparatus which applies one method to eliminate printing overrun.
Figure 21:
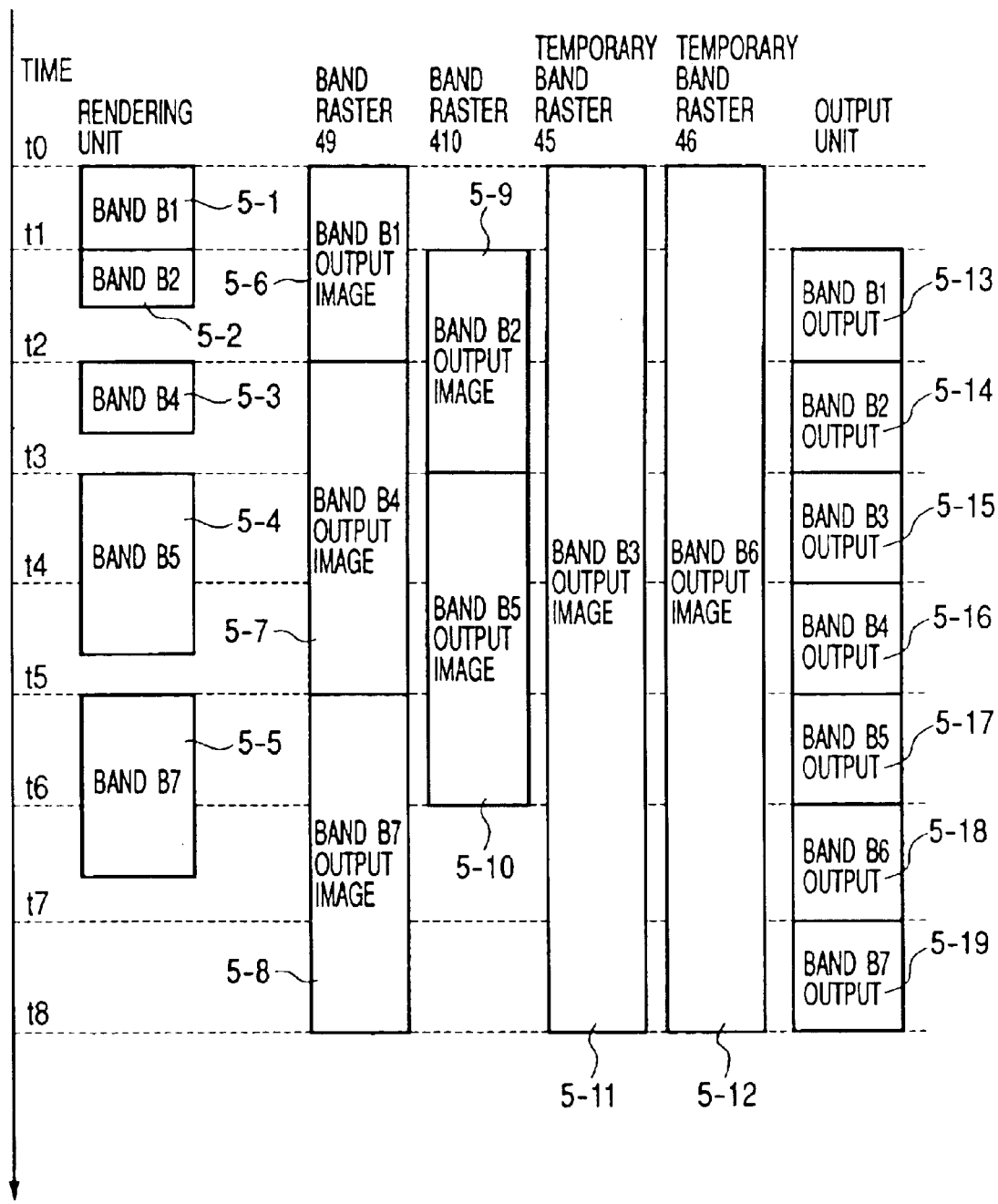
FIG. 21 is a timing chart for explaining a printing data processing state in the printing control apparatus of FIG. 20.

Incidentally, it is similar to the data flow in the printing control apparatus shown in FIG. 20 from the reception of the printing data from the host computer 61 to generate intermediate data to storage of the generated intermediate data in an intermediate data storage area 64 secured in memory resources.

In later rendering and shipping, processing in the present embodiment is highly different from the processing of the printing control apparatus of FIG. 20. Namely, in the present embodiment, there are plural rendering units (rendering units 68 and 67), and each rendering unit independently has band rasters (band rasters 613 and 614 and band rasters 610 and 611) to hold output images obtained as a result of the rendering. Further, each rendering unit can secure a temporary band raster if necessary.

The respective rendering units have information in the form of schedule lists 612 and 69 concerning which band is to be subjected to the rendering in what order.

The processing performed by the output unit 615 is the same as that performed by the output unit 411 shown in FIG. 20, except for processing that the output image is subjected to the shipping from the band rasters of the respective rendering units or the temporary band raster.

Next, the data processing state in the printing control apparatus of FIG. 1 will be explained with reference to a timing chart of FIG. 2.

Figure 2:
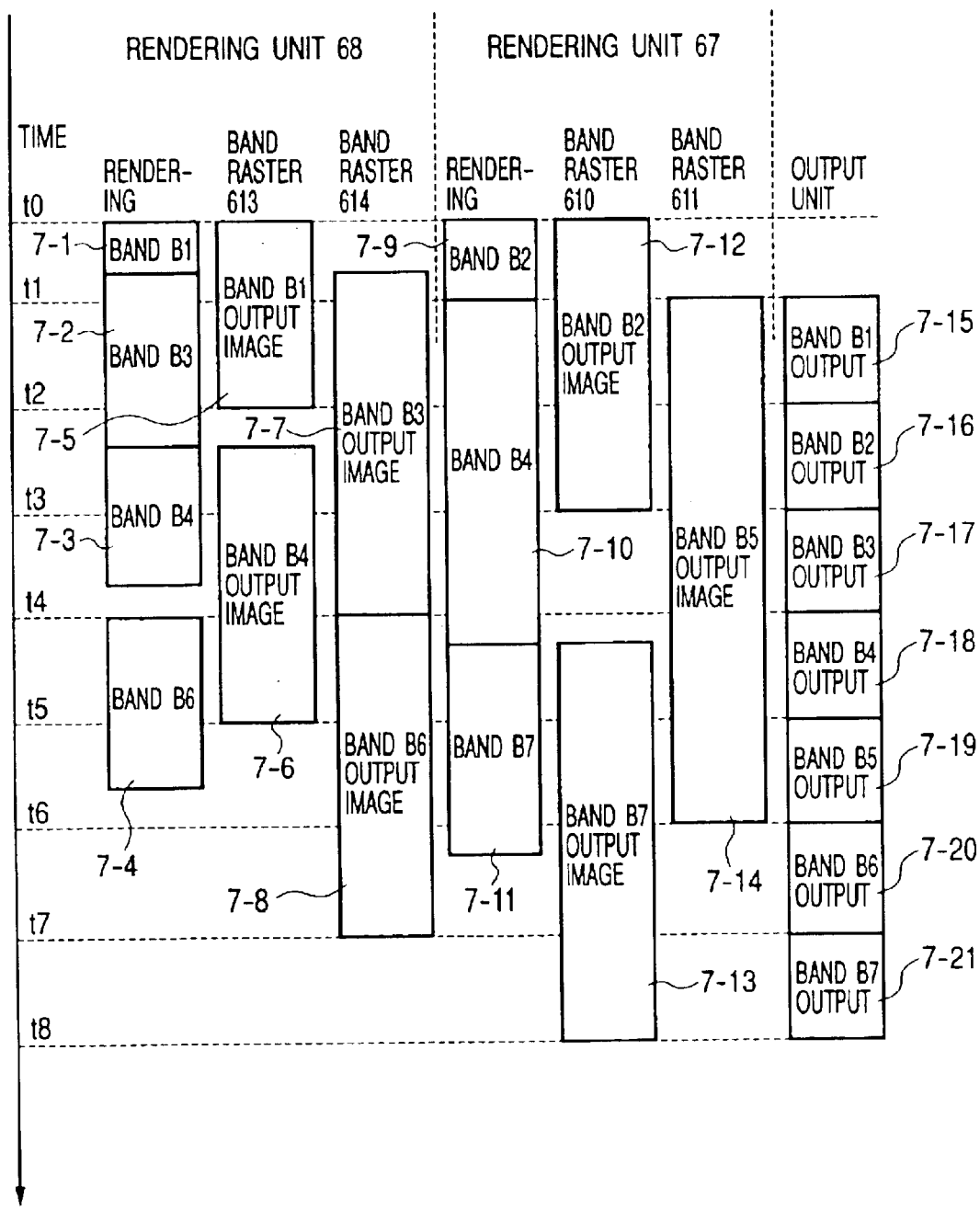
FIG. 2 is a timing chart for explaining the printing data processing state in the printing control apparatus shown in FIG. 1.

FIG. 2 is the timing chart for explaining the printing data processing state in the printing control apparatus of FIG. 1. In FIG. 2, the vertical axis represents a time axis, and the processing operations of the rendering units 67 and 68, the band rasters 613 and 614, the band rasters 610 and 611 and the output unit 615 are shown according to the passage of time. It should be noted that, in FIG. 2, the elements same as those in FIG. 1 are added with the same reference numerals, respectively.

In FIG. 2, numerals 7-1, 7-2, 7-3 and 7-4 respectively denote bands B1, B3, B4 and B6 which are subjected to the rendering by the rendering unit 68, numerals 7-5 and 7-6 denote output images which are stored in the band raster 613, and numerals 7-7 and 7-8 denote output images which are stored in the band raster 614.

Similarly, numerals 7-9, 7-10 and 7-11 respectively denote bands B2, B5 and B7 which are subjected to the rendering by the rendering unit 67, numerals 7-12 and 7-13 denote output images which are stored in the band raster 610, and numeral 7-14 denotes an output image which is stored in the band raster 611. Numerals 7-15 to 7-21 denotes bands which are subjected to the shipping at the output unit 615. The shipping for each band in the printer is not interrupted on the way (i.e., continued), and a shipping processing time for each band is identical with others.

First, the band B1 (band 7-1) is subjected to the rendering at a time t0 by the rendering unit 68, and the obtained output image 7-5 is stored in the band raster 613. At the same time, the band B2 (band 7-9) is subjected to the rendering by the rendering unit 67, and the obtained output image 7-12 is stored in the band raster 610.

In parallel with the processing that the band B1 is subjected to the shipping as the band output 7-15 at a time t1 by the output unit 615, the band B3 (band 72) and the band B5 (band 7-10) are subjected to the rendering by the rendering units 68 and 67 respectively.

Here, although it takes time to perform the rendering processing to the band B3, the previous band B2 is subjected to the rendering by the rendering unit 67. Thus, since the rendering ends by a time t3 when the shipping to the band B3 starts, printing overrun does not occur. In this case, it is unnecessary to form a temporary band raster.

Similarly, as to the bands B4 to B7 to which the rendering times are long, any overrun does not occur, and the shipping can be performed without forming any temporary band raster.

As above, the plural rendering units effectively allot the bands to be subjected to the rendering, whereby it is possible to minimize a necessary quantity of the temporary band rasters and also eliminate occurrence of overrun.

Incidentally, such allotting of the rendering is given to the rendering units 68 and 67 in the form of the schedule lists 612 and 69 respectively. A structure of the schedule list and a scheduling method will be described later.

Figure 3:
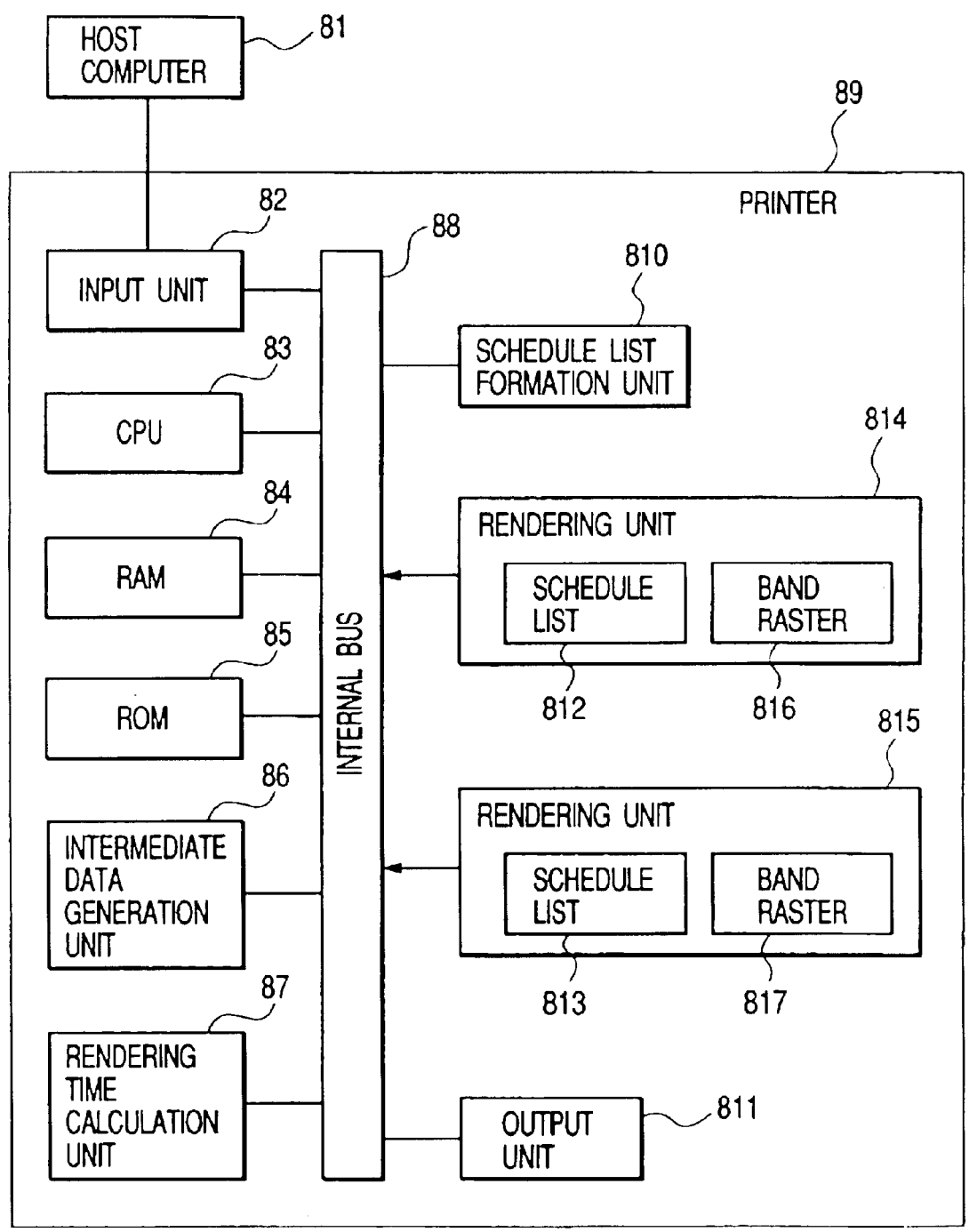
FIG. 3 is a block diagram showing an example of a printing system to which the printing control apparatus according to the first embodiment is applicable.

FIG. 3 is a block diagram showing an example of a printing system to which the printing control apparatus according to the present embodiment is applicable. Here, a laser beam printer (FIG. 17) will be explained by way of example.

It is needless to say that the present invention is applicable to a simple equipment, to a system which is composed of plural equipments, or to a system in which processing is performed through a network such as a LAN or the like, when such the apparatus or system can execute the function of the present invention.

In FIG. 3, numeral 81 denotes a host computer which is connected to a printer 89 through a predetermined interface (e.g., a two-way interface) and performs communication processing.

In the printer 89, numeral 82 denotes an input unit which performs the communication processing to the host computer 81. Although the input unit 82 receives printing data from the host computer 81, it may transmit information of the printer 89 to the computer 81 if necessary. Numeral 83 denotes a CPU which executes a control program stored in a ROM 85 or not-shown memory resources to actually perform printing processing of the printer 89 or later-described data processing.

Numeral 84 denotes a RAM which stores intermediate data obtained from the printing data received by the input unit 82, forms a temporary band raster, and holds other various processing status.

Numeral 86 denotes an intermediate data generation unit which converts the printing data buffered in the RAM 84 into the intermediate data easily manageable in the printer. As described above, the intermediate data is managed for each band. Numeral 87 denotes a rendering time calculation unit which calculates or foresees a time necessary for the rendering of the intermediate data for each band. Numeral 88 denotes an internal bus which connects the respective units with others in the printer 89.

Numeral 810 denotes a schedule list formation unit which determines a rendering schedule of each rendering unit on the basis of the rendering time of each band calculated by the rendering time calculation unit 87. Numerals 814 and 815 denote rendering units which actually perform the rendering. Although the two rendering units are provided in the present embodiment, three or more (i.e., plural) rendering units may be provided.

Numerals 812 and 813 denote schedule lists which correspond to the rendering units 814 and 815 respectively. The schedule list stores information concerning which band is to be subjected to the rendering in what order. The schedule list 812 and 813 are formed by the schedule list formation unit 810.

Numerals 816 and 817 denote band rasters which correspond to the rendering unit 814 and 815 respectively. The band raster stores the output image obtained by the rendering of the rendering unit until the shipping of the output image to an output unit 811 ends. The output unit 811 which actually forms and outputs a visible image on a sheet, based on the output image. Hereinafter, the processing which is performed by the CPU 83 based on the program stored in the ROM 85 will be explained. It should be noted that the host computer 81, the input unit 82, the intermediate data generation unit 86, the rendering units 814 and 815, the schedule lists 812 and 813, and the output unit 811 shown in FIG. 3 respectively correspond to the host computer 61, the reception unit 62, the intermediate data generation unit 63, the rendering units 68 and 67, the schedule lists 612 and 69, and the output unit 815 shown in FIG. 1. Further, the band raster 816 of FIG. 3 corresponds to the band rasters 613 and 614 of FIG. 1, and the band raster 817 of FIG. 3 corresponds to the band rasters 610 and 611 of FIG. 1.

Figure 4:
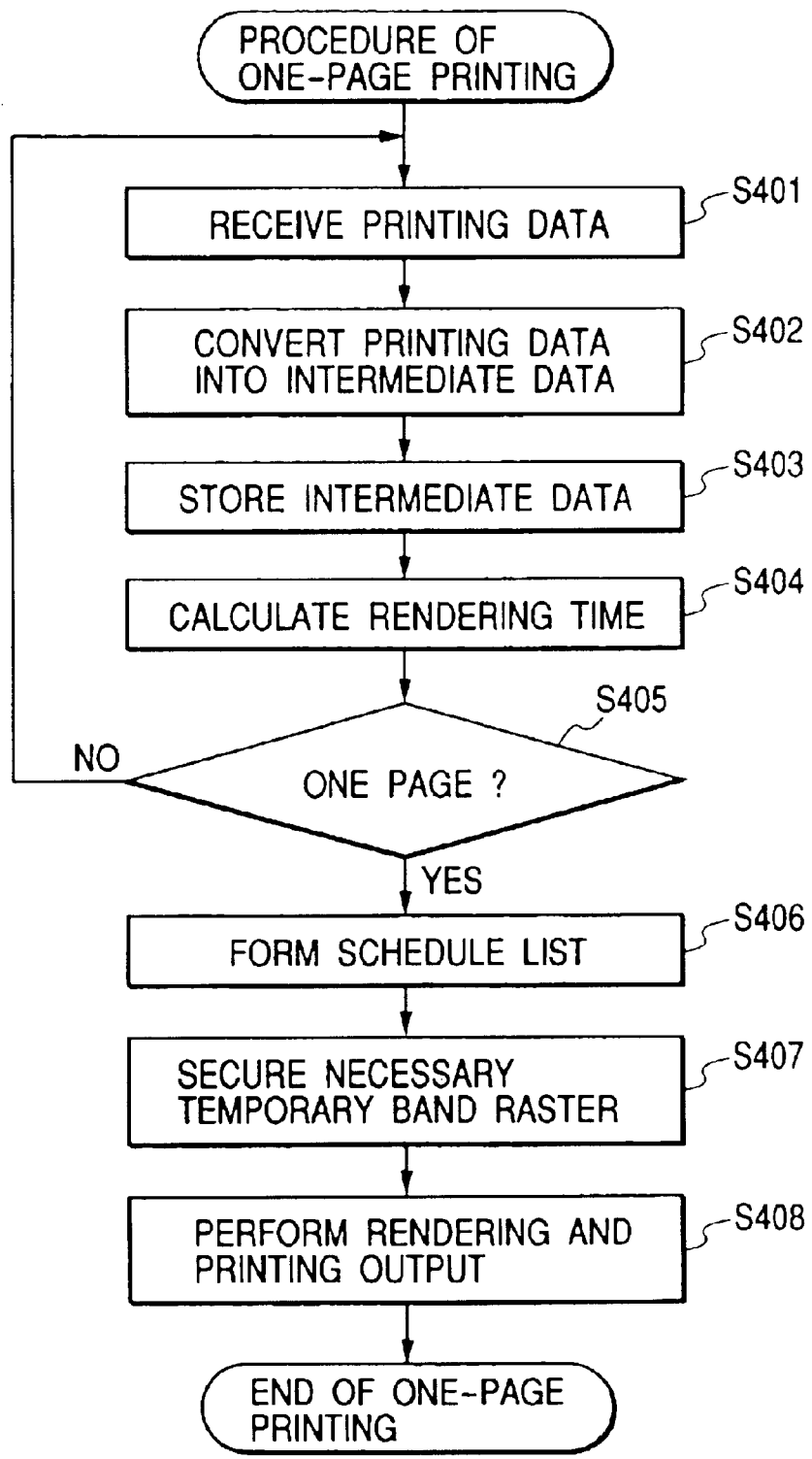
FIG. 4 is a flow chart showing an example of a first data processing procedure in the printing control apparatus according to the first embodiment.

FIG. 4 is a flow chart showing an example of a first data processing procedure in the printing control apparatus according to the present embodiment. The first data processing procedure corresponds to a procedure from the reception of the one-page printing data to the printing output of the data.

Initially, in a step S401, the printing data is received from the host computer 81 through the input unit 82. In a step S402, the received printing data is transferred to the intermediate data generation unit 86 and converted into the intermediate data. In a step S403, the intermediate data is stored in the RAM 84. The intermediate data has, e.g., a format which can be easily processed by the rendering units 814 and 815, a format by which the size of the intermediate data can be decreased, or a format by which the processing speed of the intermediate data can be increased. Namely, the format only has to be convenient in the internal processing. A structure of the intermediate data managed for each band will be described later with reference to FIG. 5.

Next, in a step S404, a time which is necessary for the rendering of the intermediate data stored in the step S403 is calculated for the processing to eliminate the printing overrun (later described in detail). The calculated times are summed for each band, thereby measuring the rendering time by the band.

Next, in a step S405, it is judged whether or not the processing of the printing data for one page ends. If judged that the processing does not end yet, the flow returns to the step S401 to process the next printing data.

Conversely, if judged in the step S405 that the processing of the printing data for one page ends, the flow advances to a step S406 to form the schedule lists 812 and 813 of the rendering units 814 and 815 by using the schedule list formation unit 810. In the step S406, the plural rendering units 814 and 815 effectively allot the rendering to perform the scheduling such that the number of temporary band rasters necessary to eliminate the overrun can be minimized. The structure of the schedule list and the scheduling method will be described later.

Next, in a step S407, the calculated temporary band raster which is necessary based on the schedule formed in the step S406 is secured in the RAM 84.

Finally, in a step S408, the band raster is subjected to the rendering according to the schedule list formed in the step S406, and the shipping is performed in parallel with such the rendering, thereby performing the printing output on the actual sheet. Thus, it is possible to prevent the printing overrun.

Figure 5:
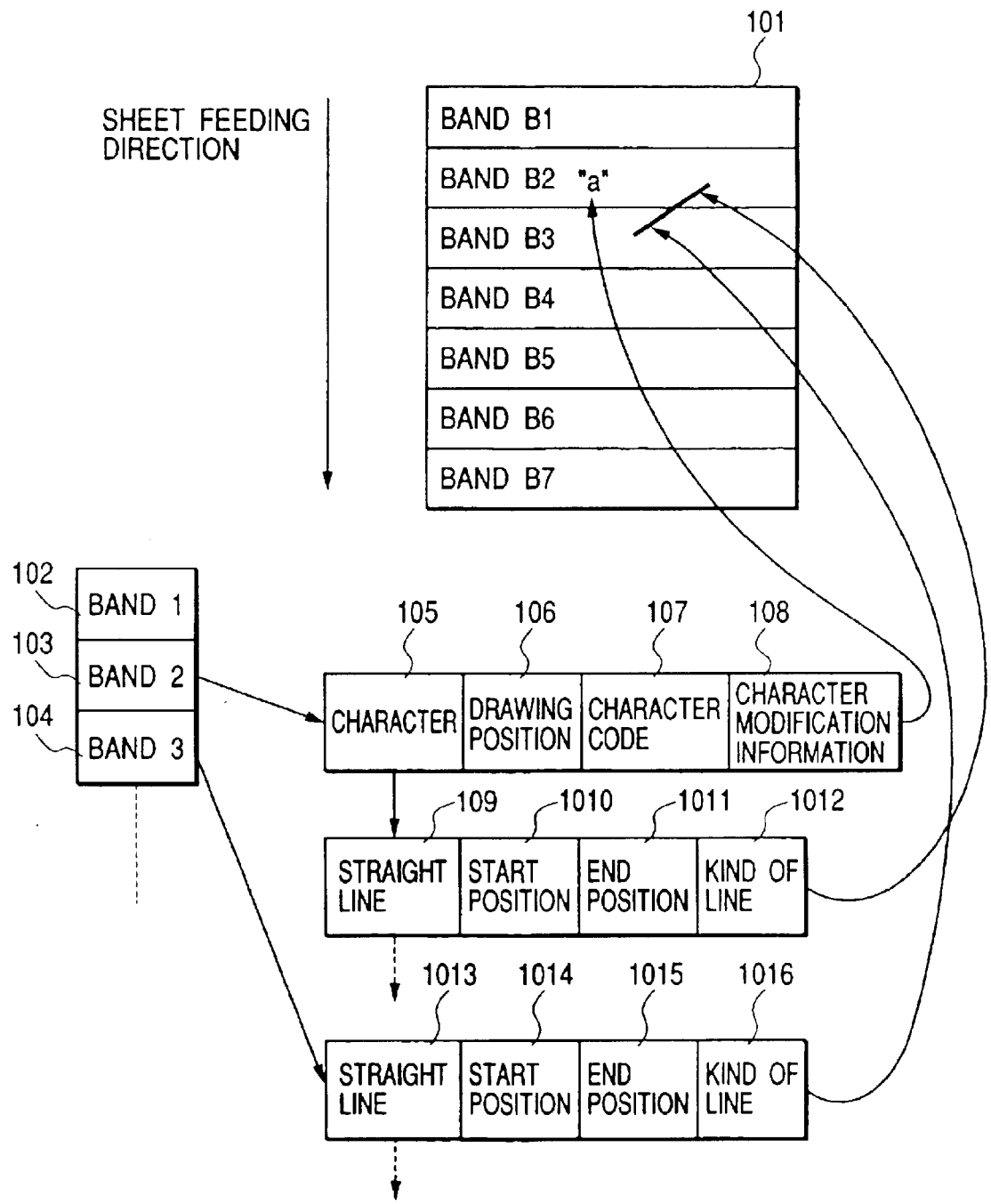
FIG. 5 is a view for explaining a structure of intermediate data generated in the printing control apparatus according to the first embodiment.

FIG. 5 is a view for explaining the structure of the intermediate data generated in the printing control apparatus according to the present embodiment. The intermediate data is generated by the intermediate data generation unit 86. Incidentally, the printing control apparatus according to the present embodiment sections one output page off into several small areas (bands), and simultaneously performs the rendering and the shipping to the bands in parallel. Thus, since the printing data is managed by the band, the printing data is managed in the form of easily manageable intermediate data.

In FIG. 5, numeral 101 denotes an output sheet of one page which is sectioned into bands B1 to B7. As shown in FIG. 5, each band is arranged to be perpendicular to the sheet feeding direction.

Further, since each of the bands B1 to 87 has the identical area, an electrostatic latent image time of the band is constant when the sheet is output. For example, if the printer receives the printing data by which one character "a" and one oblique straight line are drawn on the output sheet 101, the intermediate data of the received data has the following structure.

First, the intermediate data is connected with intermediate data management tables 102 to 104. The number of intermediate data management tables corresponds to the number of bands, and each table holds the intermediate data to be drawn in the corresponding band with a link structure.

Here, since the character "a" is the character which should be drawn in the band B2, its intermediate data 105 to 108 are connected to the intermediate data management table 103 of the band B2. The intermediate data management table 103 holds an area representing a kind of intermediate data, an area representing a drawing position, and other information concerning the drawing in accordance with the kind of intermediate data, by necessity.

For example, the intermediate data of the character "a" is composed of data 105 representing that the kind of intermediate data is a character, data 106 representing a drawing position for drawing the character "a", a character code 107 representing that the character to be drawn is "a", and information 108 representing a modification method of the character such as a capital letter, an outline, a character color and the like.

In another example, since the straight line drawn on the sheet 101 extends over the bands B2 and B3, the two kinds of intermediate data are generated and respectively connected with the intermediate data management table 103 of the band B2 and the intermediate data management table 104 of the band B3. Thus, the intermediate data to be managed is subjected to the rendering for each band and to the printing output.

Figure 6:
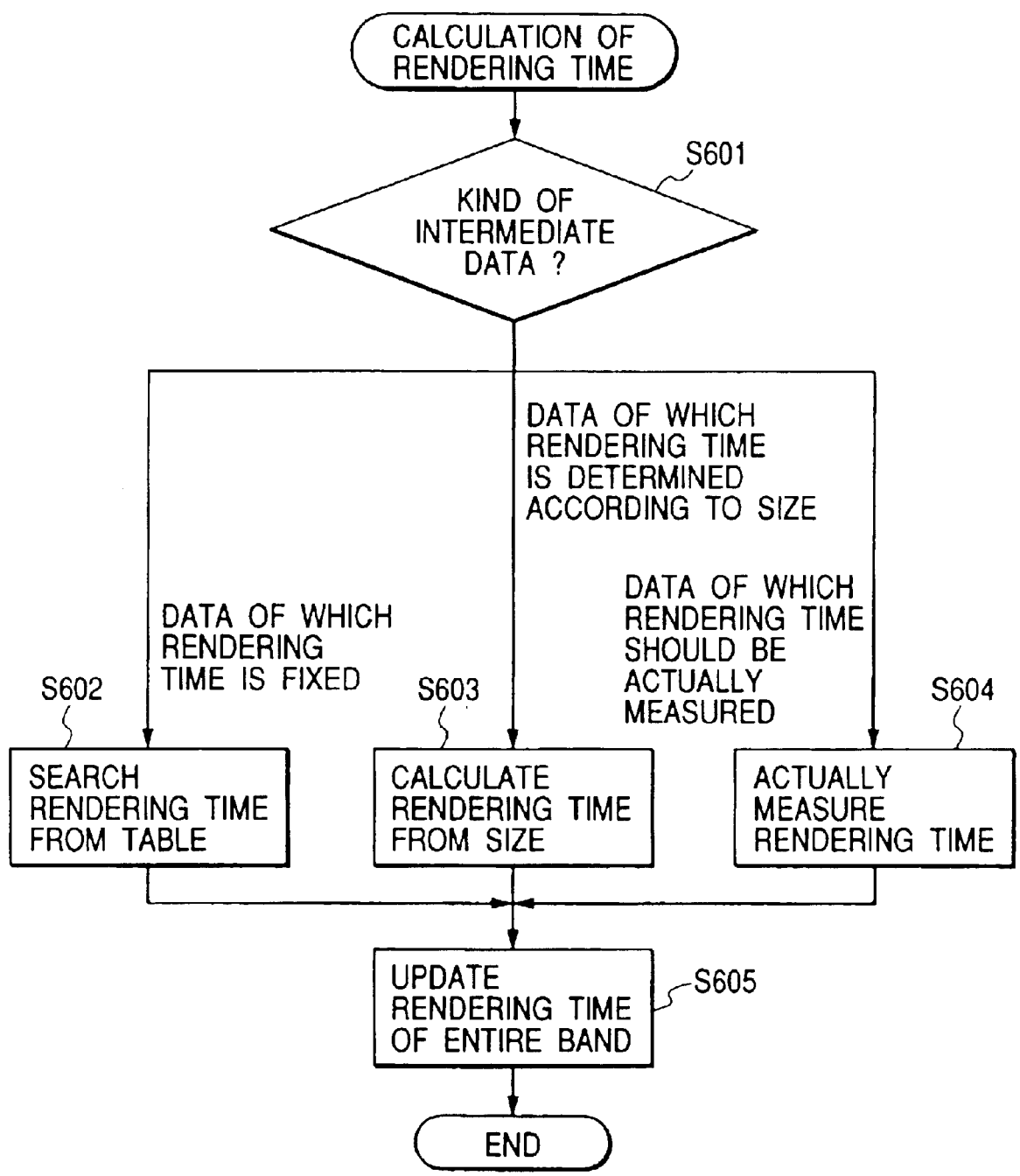
FIG. 6 is a flow chart showing an example of a second data processing procedure in the printing control apparatus according to the first embodiment.

FIG. 6 is a flow chart showing an example of a second data processing procedure in the printing control apparatus according to the present embodiment. The second data processing procedure corresponds to a processing procedure to calculate the rendering time by the band. It should be noted that the rendering time obtained in the second data processing procedure is used to form the schedule list in the step S406 (FIG. 4) and determine the number of temporary band rasters to be secured in the step S407 (FIG. 4) in the processing of overrun measures.

Initially, in a step S601, a rendering time calculation method is selected according to the kind of intermediate data. For example, when the kind of intermediate data is a type to which the rendering time is fixedly determined, the flow advances to a step S602 to obtain the rendering time from a rendering time table corresponding to the intermediate data already stored in the table (e.g., stored in the ROM 85). Concrete processing of such the type will be described later.

In the step S601, when the kind of intermediate data is a type in which the rendering is to simply copy the memory contents (e.g., image bit map), the flow advances to a step S603 to obtain the rendering time from the size of the intermediate data.

In the step S601, when the kind of intermediate data is, e.g., a type in which the rendering time is unknown if the rendering is not actually performed, the flow advances to a step S604 to actually perform the rendering to measure the time. Concrete processing of such the type will be described later.

It is needless to say that time calculation algorithm of a type other than the above types may be used in the steps S601 to S604.

As above, after the rendering time calculation processing according to the types of various intermediate data is performed, in a step S605, the calculated time is added to the rendering time of all the bands to update the rendering time, and the processing ends.

Figure 7:
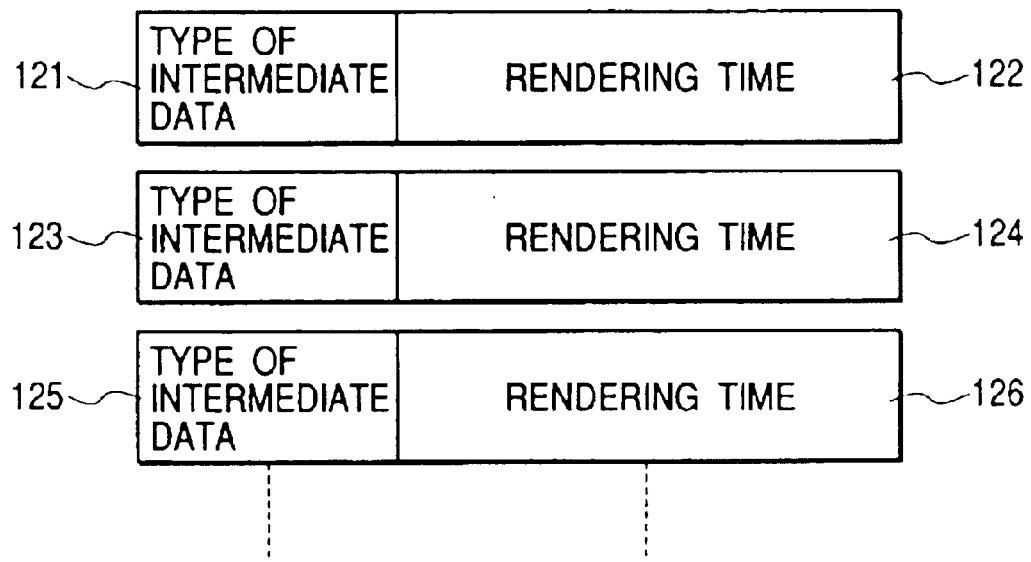
FIG. 7 is a view showing an example of a rendering time table in the printing control apparatus according to the first embodiment.

FIG. 7 is a view showing an example of the rendering time table in the printing control apparatus according to the present embodiment. It is assumed that the rendering time table is previously stored in, e.g., the ROM 85 or the like shown in FIG. 3.

In FIG. 7, numerals 121, 123 and 125 denote types of intermediate data, and it is assumed that fixed rendering times 122, 124 and 126 are stored for the types 121, 123 and 125 respectively.

Thus, with respect to the intermediate data to which the rendering is previously and fixedly known, it is possible to search and read the kind (type) of intermediate data and the corresponding rendering time from the table so as to calculate the rendering time.

Figure 8:
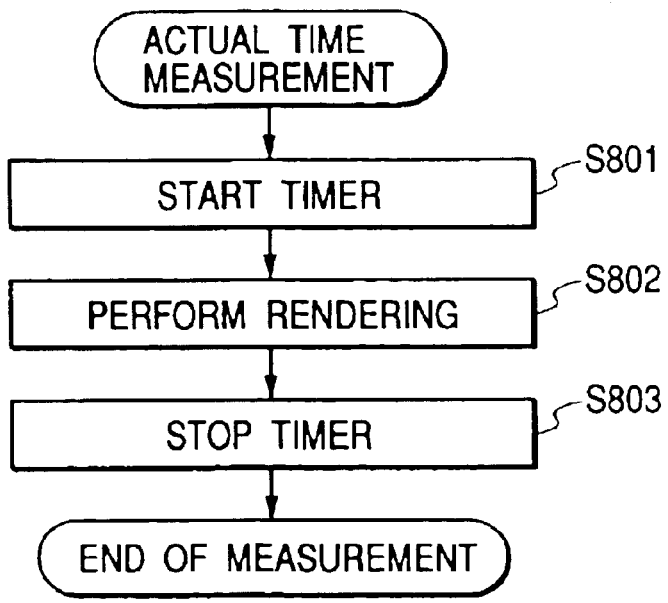
FIG. 8 is a flow chart showing an example of a third data processing procedure in the printing control apparatus according to the first embodiment.

FIG. 8 is a flow chart showing an example of a third data processing procedure in the printing control apparatus according to the present embodiment. The third data processing procedure corresponds to a detailed procedure of the actual measurement processing of the rendering time in the step S604 of FIG. 6.

Initially, in a step S801, a timer in the printing control apparatus is started. Then, in a step S802, like the actual rendering, provisional rendering is performed to the intermediate data intended to be measured, on the RAM 84. As soon as the rendering ends, the timer is stopped in a step S803. The time from the timer start to end is set as the rendering time, and the processing ends.

Figure 9:
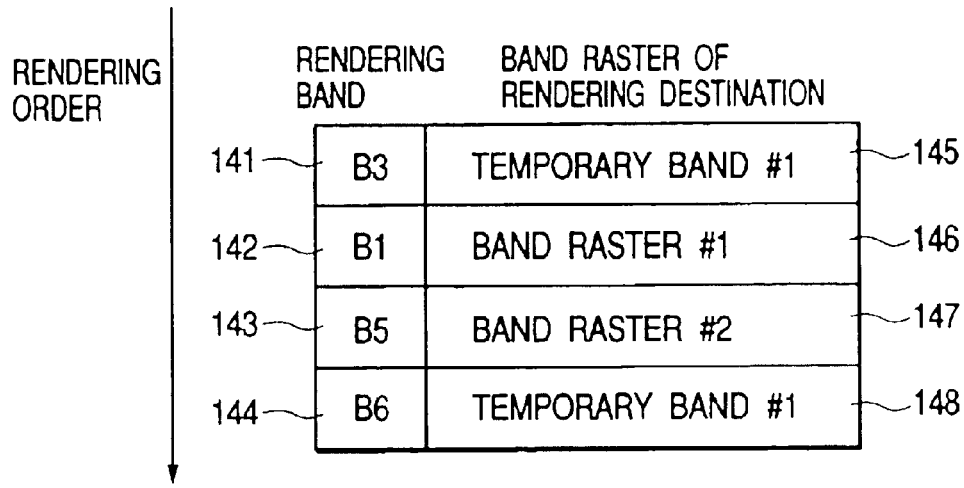
FIG. 9 is a view showing a structure of a schedule list formed by a schedule list formation unit shown in FIG. 3.

As above, the rendering time of each band is calculated, the printing data of one page is stored in the memory as shown in FIG. 4, and then the rendering schedules of the rendering units 814 and 815 are formed as the schedule lists 812 and 813 respectively with a structure shown in FIG. 9 (step S406 of FIG. 4).

FIG. 9 is a view showing the structure of the schedule list formed by the schedule list formation unit 810 of FIG. 3.

In FIG. 3, numerals 141 to 144 denote rendering bands in which, e.g., band numbers are set in the optimum order. Numerals 145 to 148 denote band rasters at rendering destinations which are set to correspond to the rendering bands 141 to 144 respectively.

In the structure of the schedule list shown in FIG. 9, a pair of the band to be subjected to the rendering and the band raster to store thus obtained output image is set, and the plural pairs are arranged with a list structure in the order of executing the rendering. Especially, in the case of FIG. 9, the band B3 is first subjected to the rendering to the temporary band raster 65, the band B1 is then subjected to the rendering to the band raster 613, the band B5 is then subjected to the rendering to the band raster 614, and the band B6 is then subjected to the rendering to the temporary band raster 65 (see FIG. 1). Namely, the rendering is performed in such the order. Hereinafter, a method to determine the schedule list will be explained in detail.

In the present embodiment, as an example of schedule list formation algorithm of the printing control apparatus, a method to recursively call the processing to form the schedule of the specific band is used. The schedule list formation unit 810 aims to minimize the necessary number of temporary band rasters by causing the plural rendering units 814 and 815 to effectively perform the rendering. Thus, when such an aim can be achieved, even if the schedule list is formed by a method other than the algorithm shown in the present embodiment, such the method does not deviate from the scope of the present invention.

The algorithm of the present embodiment is schematically featured as follows. First, a rendering destination of the band B1 is determined. Second, if it is assumed that, as a determination condition of the band raster for the rendering of a designated band Bk, the rendering of a designated band k is performed to all of the remaining band rasters (including the temporary band rasters) except for the band raster to which the rendering of a previous band (k−1) is performed, the band raster having the least number TBN of temporary band rasters is selected from among all of the remaining band rasters. Third, the number TBN of temporary band rasters necessary when the destination to which the rendering of the designated band k is performed is assumed as BR is the sum of the number of temporary band rasters necessary for the rendering of the band k to the destination BR and the number of temporary band rasters at least necessary for the rendering of a band (k+1) and following bands. Of course, when the band k is the final band, it is unnecessary to perform the rendering to the band (k+1) and the following bands. Fourth, the number of temporary band rasters necessary for the rendering of the band k to the destination BR is assumed to be "1" if the overrun occurs, or assumed to be "0" if the overrun does not occur.

The feature processing of the present embodiment, i.e., the processing to form the schedule of the specific band recursively called, preprocessing to start the recursive call, and postprocessing, will be described later.

Figure 10:
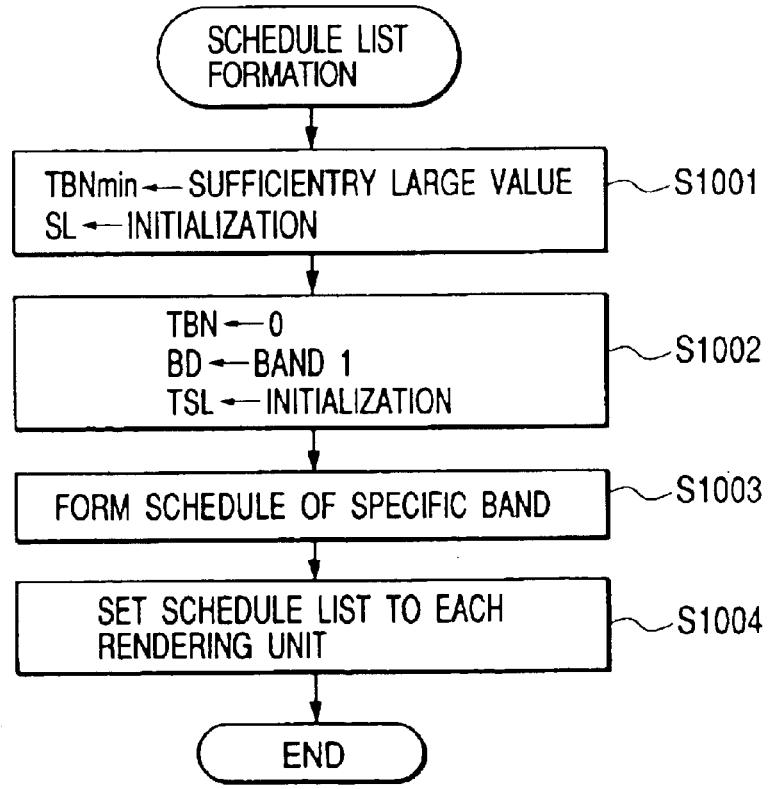
FIG. 10 is a flow chart showing an example of a fourth data processing procedure in the printing control apparatus according to the first embodiment.

FIG. 10 is a flow chart showing an example of a fourth data processing procedure in the printing control apparatus according to the present embodiment.

Here, variables and parameters shown in FIG. 10 will be explained. Symbol TBNmin denotes the minimum necessary number of temporary band rasters, symbol SL denotes a schedule list by which the necessary number of temporary band rasters becomes TBNmin, symbol BD denotes a band which is assumed to be subjected to the rendering thence in the schedule list forming, symbol TBN denotes the number of temporary band rasters which is necessary till then in the schedule list forming, and symbol TSL denotes a schedule list by which the necessary number of temporary band rasters becomes TBN in the schedule list forming.

In an entire processing flow of the algorithm of the present embodiment, as the band BD to be subjected to the rendering is set from the band B1 to the final band B7 in due order, the schedule of the specific band is determined. Namely, when many schedule lists are formed and the number TBN of temporary band rasters necessary for the formed schedule lists becomes smaller than the minimum necessary number TBNmin of temporary band rasters formed till then, that the schedule list TSL is updated and registered as the most effective schedule list SL.

Thus, as preprocessing, the number TBNmin is set to a sufficiently large value (e.g., a value larger then the total number of bands by "1") in a step S1001. Thus, in the initially formed schedule list, it is discriminated that the number of temporary band rasters unconditionally necessary at that time is minimum. Further, in the step S1001, the schedule list SL is initialized.

Next, in a step S1002, as default to form many schedule lists, the number TBN is set to "0", the band BD is set to the initial band B1, and the schedule list TSL is initialized.

In a step S1003, the schedule is formed for the specific band indicated by the band BD. In the processing of this step, one recursively calls oneself, thereby effectively checking all schedule patterns.

Next, in a step S1004, the schedule list in which the number of temporary band rasters is minimum and which is selected from the schedule lists of all patterns is set to the schedule list SL, and the number of temporary band rasters necessary in that schedule list is set to the number TBNmin. Thus, the schedule list is set to each rendering unit according to these parameters in the step S1004, and the processing ends.

In the processing flow of the entire printer, as shown in the step S407 of FIG. 4, thence the temporary band raster is actually secured according to the number TBNmin.

Figure 11:
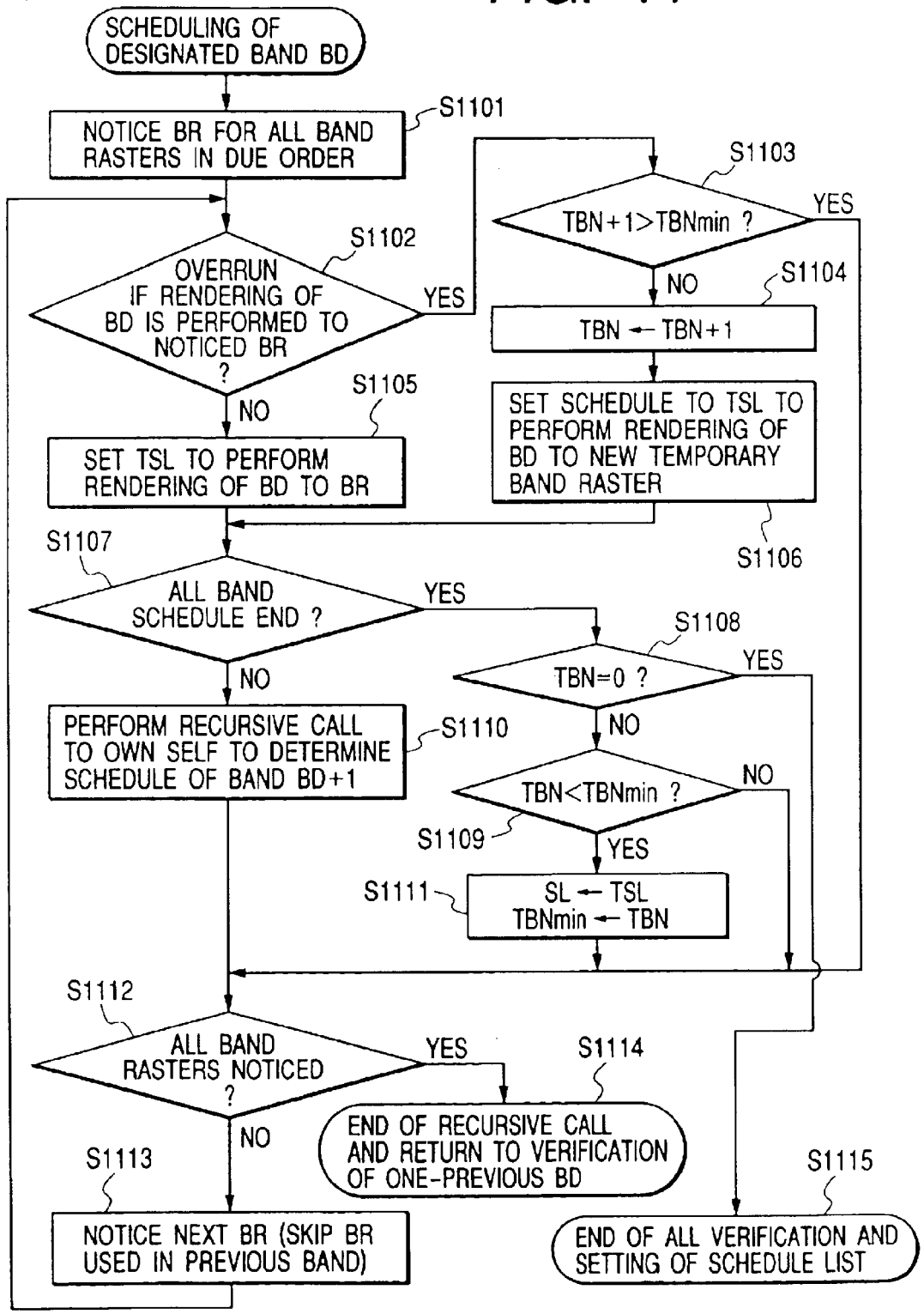
FIG. 11 is a flow chart showing an example of a fifth data processing procedure in the printing control apparatus according to the first embodiment.

FIG. 11 is a flow chart showing an example of a fifth data processing procedure in the printing control apparatus according to the present embodiment. The fifth data processing procedure corresponds to schedule processing of the designated band recursively called. When the time necessary to perform the shipping of one band is "1.0", the times necessary to perform the rendering of the respective bands are shown as rendering times in FIG. 18. Hereinafter, the fifth data processing procedure will be explained as an example of the rendering times.

It should be noted that symbol BR in FIG. 11 denotes a band raster which is noticed as a rendering destination. In the flow chart of FIG. 11, as the band BD (the bands B1 to B7 in FIG. 18) which is noticed as the band to be subjected to the rendering is changed in a step S1101, the processing in steps S1102 to S1112 is repeated, thereby verifying whether the number of temporary band rasters necessary for the formed schedule list becomes minimum.

Here, the band BD is finally changed in a step S1113 such that all the band rasters except for one band raster including the temporary band raster are noticed. Thus, the band raster which is not noticed is the band raster which was used as the destination of the previous rendering by the rendering unit.

The schedule list is formed and verified as follows. First, in the step S1102, it is judged whether or not the overrun occurs if it is assumed that the rendering of the band BD is performed to the band raster BR, on the basis of the rendering time calculated from the procedure shown in FIG. 6. A start time that the band BD can be used is assumed to be Tb, the rendering time of the band BD is assumed to be Tr, and a shipping start time of the band BD is Ts. When a condition $Tb+Tr \leq Ts$ is satisfied, it is judged that the overrun does not occur. For example, as to the band B1 in FIG. 18, Tb=0 (example of default; Tb nay have a negative value), Tr=0.6, Ts=1 (example of default), and BR="613" (reference numeral shown in FIG. 1), whereby the band B1 satisfies the above condition (i.e., the overrun does not occur).

If judged in the step S1102 that the overrun does not occur, the schedule is set to the schedule list TSL in the step S1105 such that the rendering of the band BD is performed to the band raster BR. In the above example, the rendering of the band B1 is performed to the band raster 613.

After the schedule of the band BD is determined as above, it is judged in the step S1107 whether or not the scheduling (i.e., schedule list formation) ends for all the bands (the bands B1 to B7). If judged that the scheduling does not ends, the flow advances to the step S1110 to designate the next band in the band BD and recursively call oneself. In the above example, the judgement in the step S1102 is again performed to the next band B2. In the example of FIG. 18, since the band B2 is verified without verifying the band raster 613 of the band B1, the band raster 614 (BR="614") is verified. Namely, Tb=0.6 (the band raster 614 can not be used until the rendering of the band B1 ends), Tr=1.0, and Ts=2.0, whereby the band B2 satisfies the above condition (i.e., the overrun does not occur). Similarly, as to the band B3, BR="613", Tb=2.0 (the band raster 613 can not be used until the shipping of the band B1 ends), Tr=1.8, and Ts=3.0, whereby the band B3 does not satisfy the above condition (i.e., the overrun occurs).

If judged in the step S1102 that the overrun occurs, then it is judged in the step S1103 whether or not a new temporary band raster should be secured in the following manner. Namely, it is judged whether or not the number (TBN+1) of temporary band rasters in case of newly securing the temporary band raster exceeds the minimum necessary number TBNmin. If judged that TBN+1 >TBNmin, since the schedule list by which the number of temporary band rasters decreases already exists, the verification is interrupted, and the flow advances to the step S1112.

Conversely, if judged in the step S1103 that the TBN+1 does not exceed the number TBNmin, i.e., if judged that the temporary band raster should be secured, the number TBN is increased by "1" in the step S1104, and the schedule is set to the schedule list TSL in the step S1106 such that the rendering of the band BD is performed to the new temporary band raster. A sufficiently large value is set as default to the number TBNmin, the rendering of the band B3 (BD=B3) is performed to the temporary band raster.

Such processing is repeated to the final band (the band B7). Thus, the band rasters which were allocated to the bands B1 to B7 are shown in the schedule list TSL of FIG. 18. In FIG. 18, symbols *1, *2 and *3 denote temporary band rasters, respectively.

On the other hand, if judged in the step S1107 that the scheduling ends for all the bands, it is judged in the step S1108 whether or not the number TBN is "0". If judged that the number TBN is not "0", the number TBN is compared with the number TBNmin in the step S1109 to judge whether or not the number TBN is smaller than the number TBNmin. If judged that TBN<TBNmin, since the schedule list TSL has the minimum number of temporary band rasters verified till then, the schedule list TSL is set to the schedule list SL, and the number TBN is set to the number TBNmin. In case of a schedule list TSL1 of FIG. 18, the schedule list TSL1 is set to the schedule list SL, and the number TBNmin is set to TBNmin=3.

Next, it is judged in the step S1112 whether or not the verification of the band BD with notice to all the band rasters ends till then. If judged that the verification ends, the verification step to the one-previous band BD from the recursive call ends in a step S1114. Immediately after the schedule list TSL1 of FIG. 18 is set to the schedule list SL, the verification to all the band rasters does not end for the final band B7. Thus, BR="614", BR="610" and BR ="611" are sequentially allocated to the final band B7 through the step S1113, and the processing in the steps S1102 to S1111 is repeated. In case of BR="614" (TSL2 in FIG. 18), TBN=3, whereby the band B7 satisfies the above condition in the step S1109. Thus, the schedule list TSL2 is set to the schedule list SL, and the number TBNmin is set to TBNmin=3. In case of BR="610" and "611", TBN=3, whereby the band does not satisfy the above condition in the step S1109. Thus, the schedule list SL is not set. After all the band rasters are allocated to the final band B7 and the band is verified, the flow advances from the step S1112 to the step S1114 to return to the processing for the one-previous band B6.

BR="614" is allocated to the band B6, and the above processing is performed. Then, when each band has such the allocation as in the schedule list TSL3 of FIG. 18, the number of temporary band rasters becomes "2" (TBN=2), and the schedule list TSL3 is set to the schedule list SL in the step S1111. After then, as the band rasters are allocated to the bands B1 to B7 in succession, the processing in the steps S1102 to S1111 is repeated. Schedule lists TSL4 and TSL5 are subsequently set to the schedule list SL. When the band rasters are allocated as shown in the schedule list TSL5, the number TBN satisfies TBN=0.

If it is judged in the step S1108 that the number TBN satisfies TBN=0, since this schedule list has the minimum number of temporary band rasters, the flow advances to a step S1115. In this step, the entire verification ends, and the schedule list TSL is set to the schedule list SL. Therefore, in the example of FIG. 18, the schedule corresponding to the schedule list TSL5 is fixed as the schedule actually executed. The schedule list corresponding to the schedule list TSL5 is shown in FIG. 19, and FIG. 2 shows the timing when the operation is performed according to such the schedule shown in FIG. 19. Having explained above is the processing performed when the schedule list is formed in the first embodiment.

Figure 12:
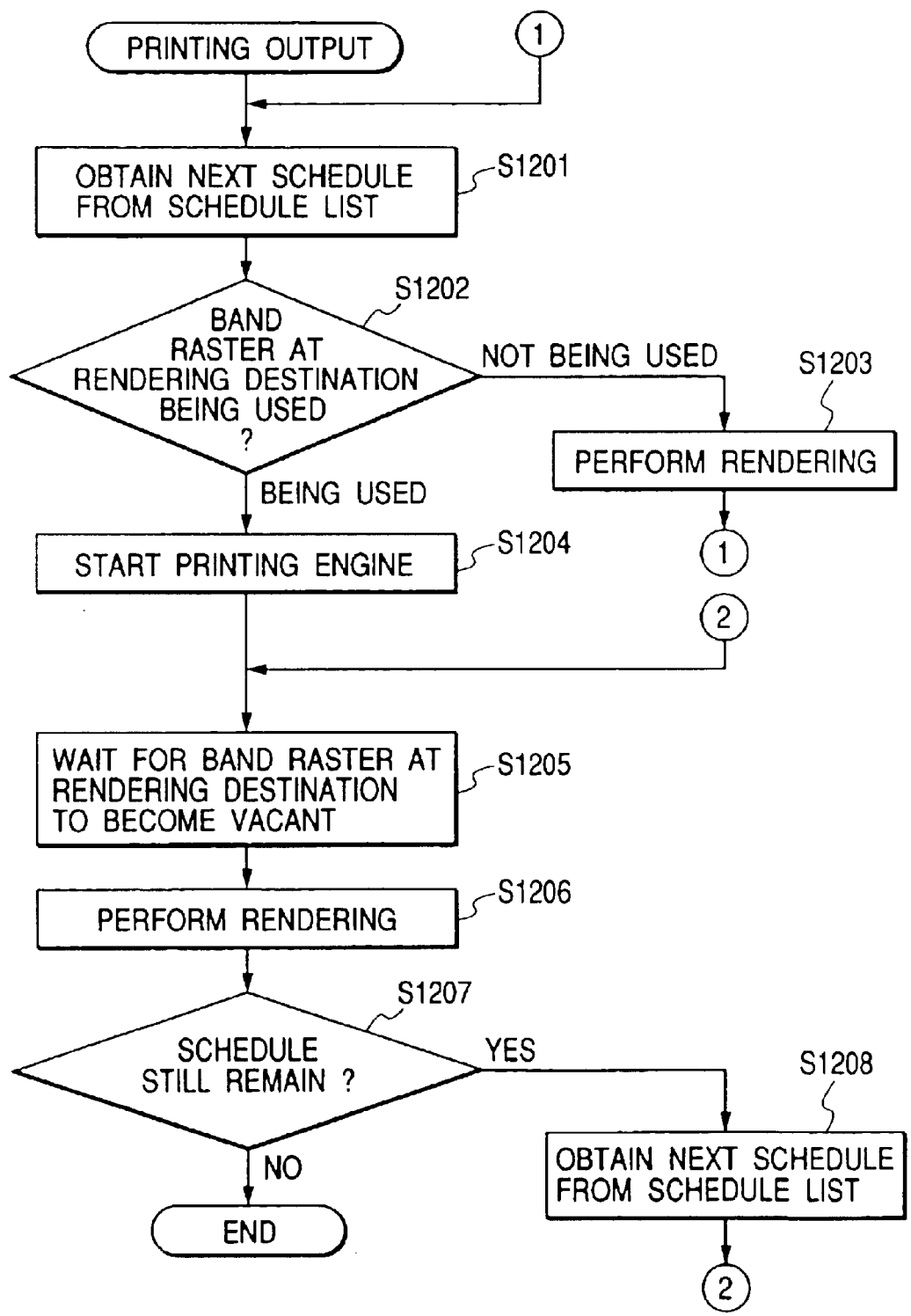
FIG. 12 is a flow chart showing an example of the fifth data processing procedure in the printing control apparatus according to the first embodiment.

FIG. 12 is a flow chart showing an example of the fifth data processing procedure in the printing control apparatus according to the present embodiment. This procedure corresponds to a processing procedure which is performed to actually print data with use of the formed schedule list (the step S408 in FIG. 4).

First, in a step S1201, the first schedule is obtained from the schedule list. It is judged in a step S1202 whether or not the band raster at the rendering destination is being used. If judged that the band raster is not used (i.e., the band raster can be used for the rendering), the rendering of the intermediate data of the designated band is performed in a step S1203, and the flow returns to the step S1201 to obtain the next schedule from the schedule list. If judged that the band raster is not used also in the next schedule, then the rendering is performed, and the flow again returns to the step S1201. Thus, it is possible to previously perform the rendering for all the schedules which are executable before a start of a printing engine.

At first, since any band rasters are not used, the rendering can be surely performed. Further, it should be noted that the processing in the steps S1201 to S1203 is performed to all of the rendering units in parallel.

Conversely, if judged in the step S1202 that there is no rendering executable for all the rendering units, the flow advances to a step S1204 to start the printing engine. Then the rendering results are printed and output on actual sheets from the band B1 in due order, and the band raster becomes vacant or blank after the outputting ends.

Thus, the flow advances to a step S1205 to wait until the band raster in which the rendering result is next stored according to the schedule becomes vacant. Then the rendering is performed in a step S1206.

Since the rendering in this case is assured to end without fail until the timing of printing and outputting the rendering result of that band, the printing overrun does not occur.

The above processing is repeated for all the schedules in the schedule lists of all the rendering units. Namely, it is judged in a step S1207 whether or not there is a schedule. If judged that there is no schedule, the printing output processing for one page ends.

Conversely, if judged in the step S1207 that the schedule still remains, the flow advances to a step S1208 to obtain the next schedule from the schedule list, and the flow returns to the step S1205.

As explained above, in the printing control apparatus according to the first embodiment, it is possible to increase memory efficiency by suppressing the necessary number of temporary band rasters, and also it is possible to prevent occurrence of the printing overrun.

(Second Embodiment)

In the above-described first embodiment, the case where the printing data subjected to the rendering is held as it is was explained. However, it may be structured that a band of which rendering time is long is previously subjected to the rendering and then compressed to diminish the size of printing data, thereby shortening a shipping waiting time. Hereinafter, the second embodiment which is directed to such a structure will be explained.

Figure 13:
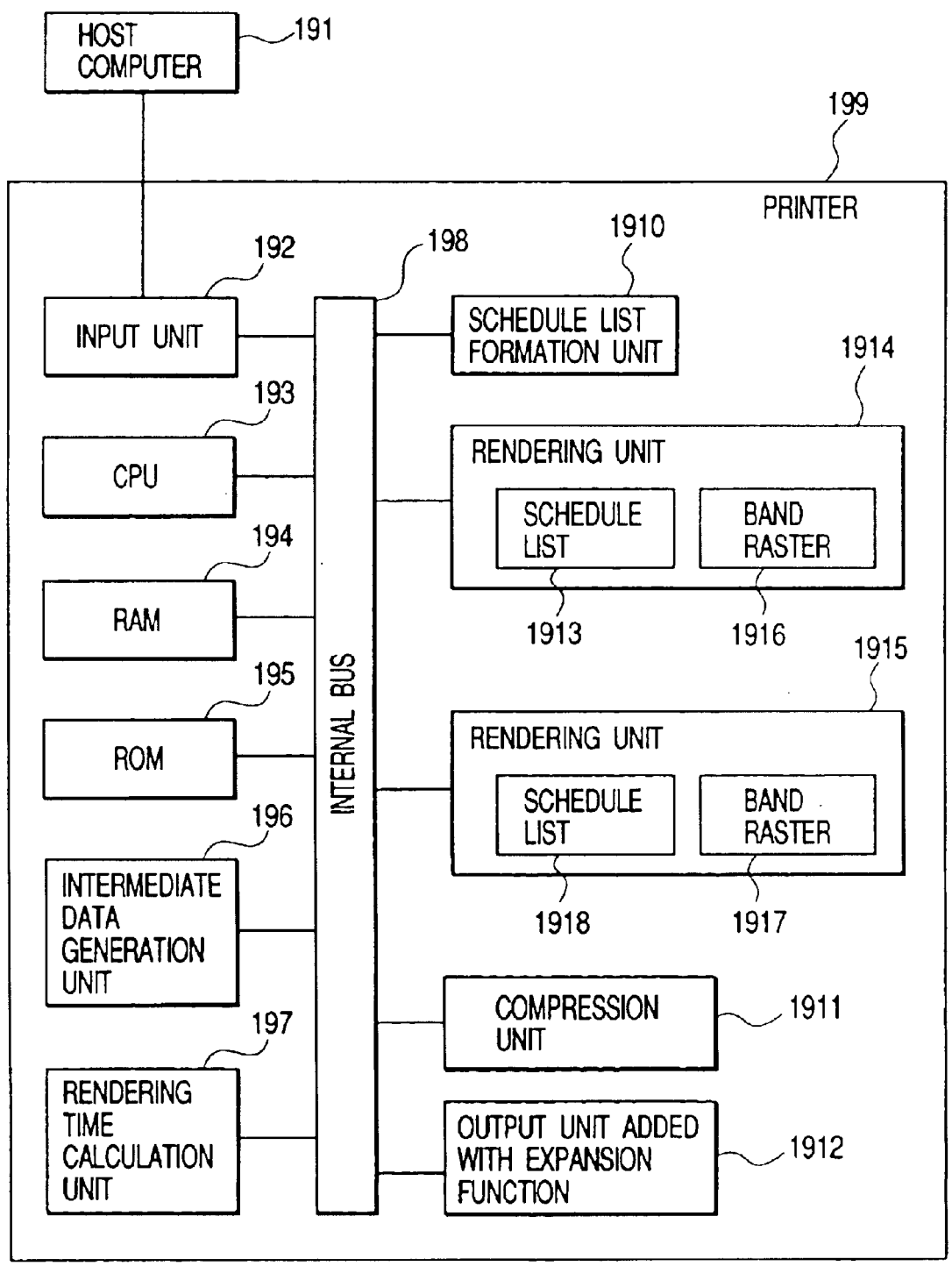
FIG. 13 is a block diagram showing a structure of a printing system to which a printing control apparatus according to the second embodiment is applicable.

FIG. 13 is a block diagram showing a structure of a printing system to which a printing control apparatus according to the present embodiment is applicable. It should be noted that, since the present embodiment has the parts common to the first embodiment, only the parts different from the first embodiment will be explained in the present embodiment.

Structures of reference numerals 191 to 199 and 1910 in FIG. 13 are the same as those of reference numerals 81 to 89 and 810 in FIG. 3, respectively.

Further, a rendering unit 1914, a rendering unit 1915, a schedule list 1913, a schedule list 1918, a band raster 1916 and a band raster 1917 have substantially the same functions as those of the rendering unit 814, the rendering unit 815, the schedule list 812, the schedule list 813, the band raster 816 and the band raster 817 shown in FIG. 3, respectively. Thus, the explanation of these units will be omitted in the present embodiment.

In the present embodiment, an output unit 1912 has an expansion function. Thus, the output unit 1912 outputs an output image or an output image obtained by expanding compressed output image actually on a sheet as a visible image.

Besides, a compression unit 1911 which is not shown in the first embodiment is provided in the present embodiment. The compression unit 1911 compresses the output image according to a predetermined encoding system.

Figure 14:
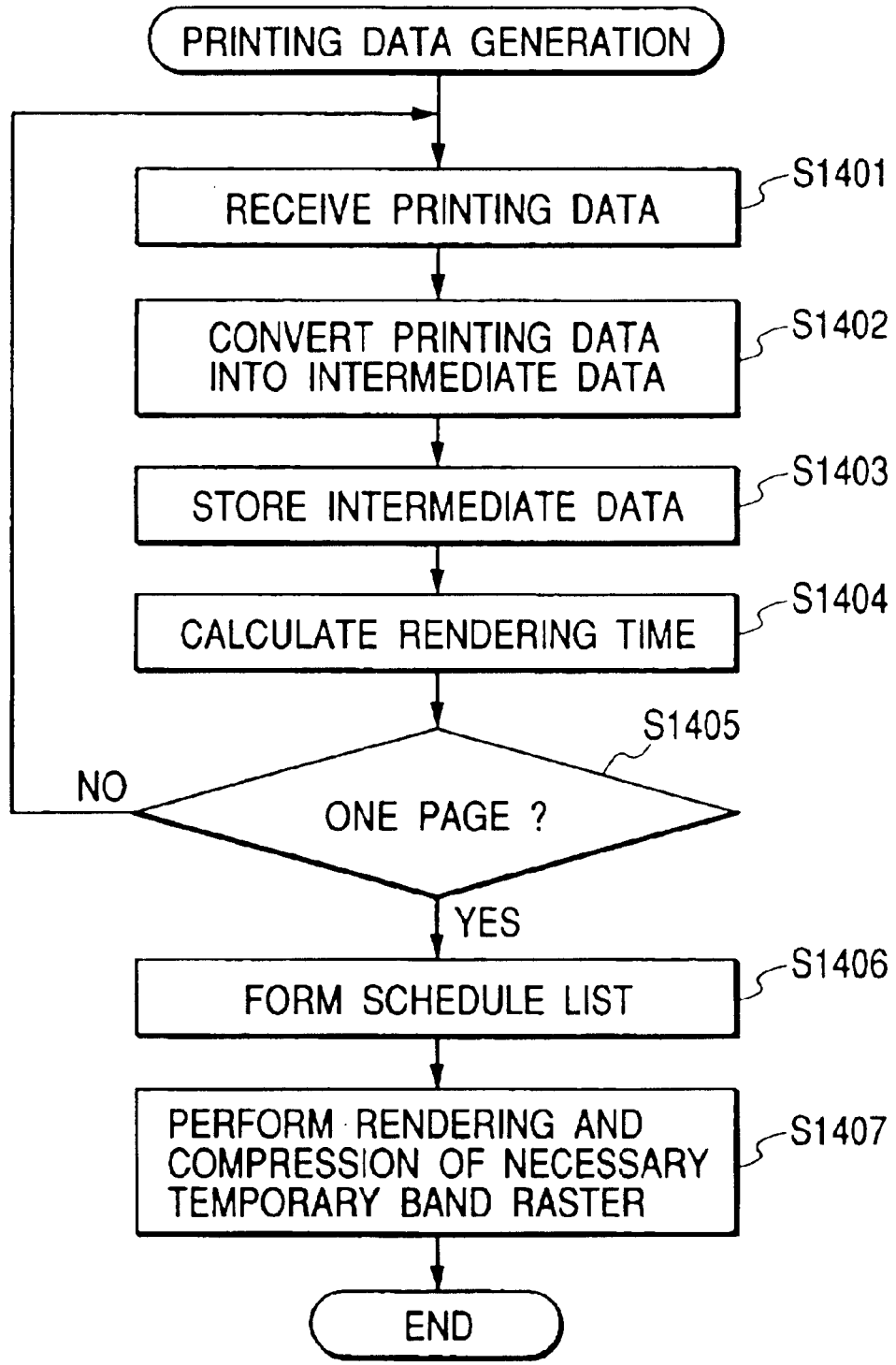
FIG. 14 is a flow chart showing an example of a sixth data processing procedure in the printing control apparatus according to the second embodiment.

FIG. 14 is a flow chart showing an example of a sixth data processing procedure in the printing control apparatus according to the present embodiment. The sixth data processing procedure corresponds to printing processing in the printing control apparatus of FIG. 13.

Initially, in a step S1401, the printing data is received from the host computer 191 through the input unit 192. In a step S1402, the received printing data is transferred to the intermediate data generation unit 196 and converted into intermediate data. In a step S1403, the intermediate data is stored in the RAM 194. The intermediate data has, e.g., a format which can be easily processed by the rendering units 1914 and 1915, a format by which the size of the intermediate data can be decreased, or a format by which the processing speed of the intermediate data can be increased. Namely, the format only has to be convenient in the internal processing.

Next, in a step S1404, a time which is necessary for the rendering of the intermediate data stored in the step S1403 is calculated for the processing to eliminate printing overrun. The calculated times are summed for each band, thereby measuring the rendering time by the band.

Next, in a step S1405, it is judged whether or not the processing of the printing data for one page ends. If judged that the processing does not end yet, the flow returns to the step S1401 to process next printing data.

Conversely, if judged in the step S1405 that the processing of the printing data for one page ends, the flow advances to a step S1406 to form the schedule lists 1913 and 1918 of the respective rendering units 1914 and 1915 by using the schedule list formation unit 1910. In this step, it is scheduled to minimize the number of temporary band rasters necessary for overrun elimination.

After then, in a step S1407, an output image to be subjected to the rendering and held in the temporary band raster is previously subjected to the rendering by the rendering unit 1915 used for data generation. The obtained data is then compressed by the compression unit 1911 and stored in the RAM 194, and the processing ends.

Figure 15:
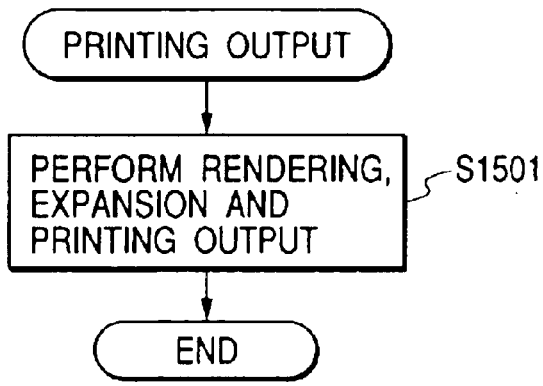
FIG. 15 is a flow chart showing an example of a seventh data processing procedure in the printing control apparatus according to the second embodiment.

FIG. 15 is a flow chart showing an example of a seventh data processing procedure in the printing control apparatus according to the present embodiment. The seventh data processing procedure corresponds to a rendering/shipping processing procedure.

When the rendering/shipping processing procedure is started, in a step S1501, the rendering of the necessary bands is performed, the band which was already subjected to the rendering/compression is subjected only to expansion processing, and then the processing ends.

According to the second embodiment, since the output image which was obtained by the long-time processing in prerendering is compressed to reduce its size, a memory using size for one page is smaller than that of the conventional printer. Thus, it is possible to reduce a memory capacity.

Figure 16:
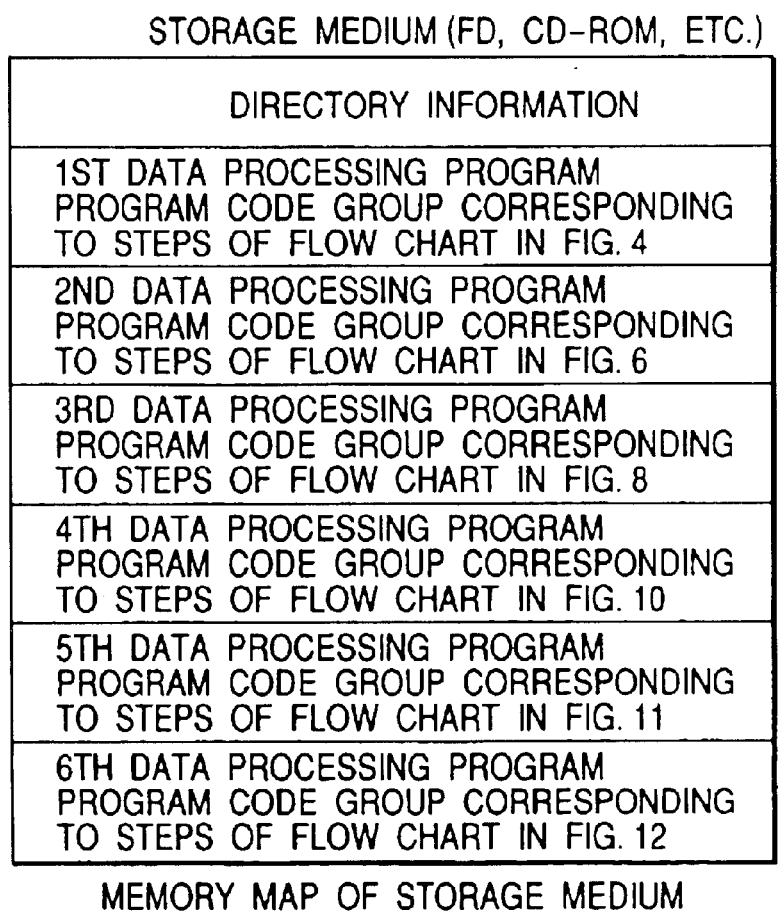
FIG. 16 is a view for explaining a memory map of a storage medium which stores various data processing programs readable by the printing system to which the printing control apparatus according to the present invention is applicable.

FIG. 16 is a view for explaining a memory map of a storage medium which stores various data processing programs readable by the printing system to which the printing control apparatus according to the present invention is applicable.

Hereinafter, a structure of the data processing program which is readable by the printing system to which the printing control apparatus according to the present invention is applicable will be explained with reference to the memory map of FIG. 16. FIG. 16 shows the memory map in case of the first embodiment. In the present embodiment, instead of the program shown in FIG. 4, the program shown in FIGS. 14 and 15 is stored in the storage medium.

Although it is not shown in the drawing, information which manages a program group stored in the storage medium (e.g., version information, a manufacturer, etc.) is also stored therein. Further, information which depends on OS or the like at a program reading side (e.g., an icon for discriminating and indicating a program, etc.) is sometimes stored in the storage medium.

Further, data corresponding to the various programs is also stored and managed at corresponding directories in the storage medium. Further, programs for installing the various programs to a computer, programs for decompressing the compressed data to be installed, and the like are sometimes stored in the the storage medium.

The functions of the present invention as shown in FIGS. 4 (or 14 and 15), 6, 8, 10 and 12 may be executed by a host computer according to a program externally installed. Here, the present invention is also applicable to a case where information group including the program is supplied to an output apparatus by a storage medium such as a CD-ROM, a flash memory or the like or from an external storage medium through a network.

As described above, it is needless to say that the object of the present invention can be achieved in a case where a storage medium storing program codes of software for realizing the functions of the above embodiments is supplied to a system or an apparatus and then a computer (or CPU or MPU) in the system or the apparatus reads and executes the program codes stored in the memory medium.

In this case, the program codes themselves read from the storage medium realize new functions of the present invention, and the storage medium storing such the program codes constitutes the present invention.

The storage medium storing the program codes can be, e.g., a floppy disk, a hard disk, an optical disk, a magnetooptical disk, a CD-ROM, a CD-R, a magnetic tape, a non-volatile memory card, a ROM, an EEPROM or the like.

Further, it is needless to say that the present invention also includes not only the case where the functions of the embodiments are realized by the execution of the program codes read by the computer, but also a case where an OS (operating system) or the like running on the computer executes all or a part of processing according to instructions of the program codes, thereby realizing the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all or a part of processing according to instructions of the program codes, thereby realizing the functions of the embodiments.

Hereinafter, a structure of a laser beam to which the embodiments of the present invention can be suitably applied will be explained with reference to FIG. 17. It should be noted that the printer to which the present invention is applied is not limited to the laser beam printer. Namely, it is needless to say that the present invention is applicable to printers of other printing systems.

Figure 17:
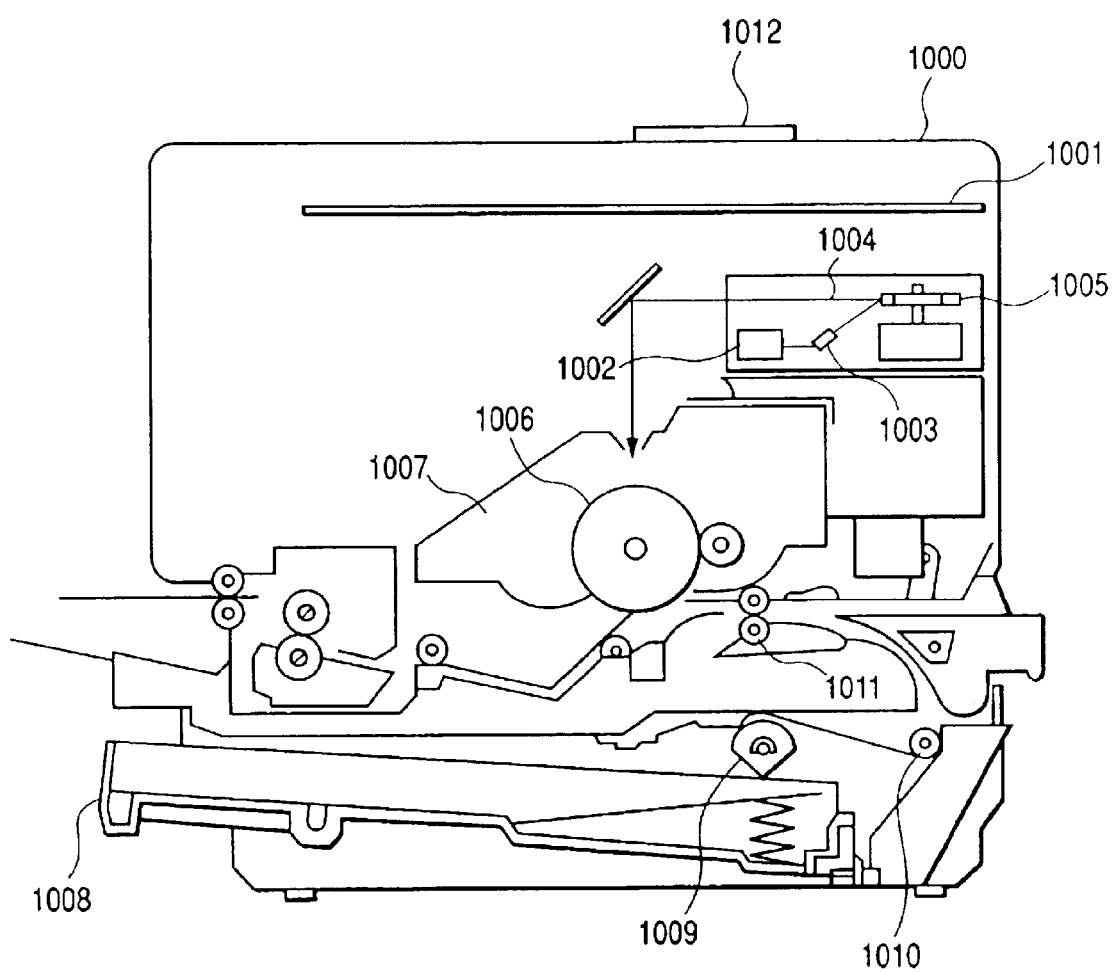
FIG. 17 is a sectional view showing a structure of a printer to which the present invention is applicable.

FIG. 17 is a sectional view showing the structure of the printer, e.g., the laser beam printer (LBP) to which the present invention is applicable.

In FIG. 17, numeral 1000 denotes a body of the LBP which inputs printing information (e.g., a character code), form information, a microcode or the like supplied from an externally connected host computer, stores the input information, generates a character pattern or a form pattern according to the stored information, and forms images on a recording medium (e.g., a recording sheet).

Numeral 1012 denotes an operation panel on which a switch for a scanning operation, a display such as an LED, and the like are disposed.

Numeral 1001 denotes a printer control unit which controls the body 1000 of the LBP as a whole and analyzes character information of the like supplied from the host computer. The printer control unit 1001 mainly converts the character information into a video signal representing a character pattern, and outputs the video signal to a laser driver 1002.

The laser driver 1002 drives a semiconductor laser 1003, and turns on and off a laser beam 1004 from the laser 1003 in accordance with the input video signal. The laser beam 1004 is shaken right and left by a rotative polygonal mirror, and an electrostatic drum 1006 is scanned and exposed. Thus, an electrostatic latent image of a character pattern is formed on the drum 1006. The formed electrostatic latent image is developed by a development unit 1007 disposed on the periphery of the electrostatic drum 1006, and transferred to the recording sheet.

When cut sheets are used as the recording sheets, the cut sheets are held in a sheet cassette 1008 installed in the body 1000 of the LBP, taken in the body 1000 by a sheet feeding roller 1009 and carrying rollers 1010 and 1011, and carried to the electrostatic roller 1006. Further, the body 1000 of the LBP has at least one card slot such that an optional font card or a control card (emulation card) of a different language system is connectable to the LBP.

According to the above embodiments, it is possible to increase memory efficiency by suppressing the necessary number of temporary band rasters, and also it is possible to prevent occurrence of the printing overrun. Further, since the intermediate data of a type which can be easily converted into the image data is applied, it is possible to perform high-speed image expansion in the band expansion.

Further, the memory using size of one page is smaller than that of the conventional printer. Further, since the prerendering time is short, it is possible to shorten the shipping waiting time.

The form of the schedule list or the method of forming the schedule list explained in the above embodiments are merely examples. Namely, other forms and methods are applicable when these forms and methods are based on the calculated rendering time.

Although the present invention has been explained by using the preferred embodiments, the present invention is not limited to the structures of these embodiments. Namely, it is needless to say that various modifications and changes are possible in the present invention without departing from the spirit and scope of the appended claims.

What is claimed is:

1. A printing control apparatus comprising:

plural expansion processing means for expanding printing data of a predetermined format to image data of a format to be output to a printer, wherein the output to the printer is performed on a segment basis;

calculation means for calculating, before the expansion processing is performed by said plural expansion processing means, a processing time necessary to expand the printing data to the image data for each segment; and scheduling processing means for scheduling the expansion processing for each segment by said plural expansion processing means, based on the processing time calculated by said calculation means, wherein each of said plural expansion processing means has band raster memory areas, independent of the other plural expansion processing means, to hold output images, and wherein said scheduling processing means checks a plurality of schedule patterns obtained by assigning each segment to each band raster memory areas specifies one of the plurality of schedule patterns that has the smallest number of temporary band rasters, and schedules which segments should each of said plural expansion processing means perform the expansion process on.

2. An apparatus according to claim 1, further comprising transfer means for transferring the expanded image data to the printer, wherein said scheduling processing means further comprises judgment means for judging, for each segment, based on the processing time calculated by said calculation means, whether or not the expansion processing is to be performed by said expansion processing means before the transfer of the image data is started.

3. An apparatus according to claim 2, further comprising compression means for compressing the expanded image data for the segment to which it was judged by said judgment means that the expansion processing is to be performed by said expansion processing means before the transfer of the image data is started.

4. An apparatus according to claim 1, further comprising:

reception means for receiving output data from a data processing apparatus; and conversion means for converting the received data into printing data of a predetermined format.

5. An apparatus according to claim 1, wherein the printing data of the predetermined format is intermediate data of a format classified for each segment.

6. A data processing method for a printing control apparatus comprising:

an expansion processing step, of expanding, using plural expansion processing means, printing data of a predetermined format to image data of a format to be output to a printer, wherein the output to the printer is performed on a segment basis;

a calculation step, of calculating, before the expansion processing is performed by the plural expansion processing means, a processing time necessary to expand the printing data to the image data for each segment; and a scheduling processing step, of scheduling the expansion processing for each segment by the plural expansion processing means, based on the processing time calculated in said calculation step, wherein each of the plural expansion processing means has band raster memory areas, independent of the other plural expansion processing means, to hold output images, and wherein said scheduling processing step includes checking a plurality of schedule patterns obtained by assigning each segment to each band raster memory area, specifying one of the plurality of schedule patterns that has the smallest number of temporary band rasters, and scheduling which segments should each of the plural expansion processing means perform the expansion process on.

7. A method according to claim 6, further comprising a transfer step, of transferring the expanded image data to the printer, wherein said scheduling processing step includes a judgment step, of judging, for each segment, based on the processing time calculated in said calculation step, whether or not the expansion processing is to be performed in said expansion processing step before the transfer of the image data is started.

8. A method according to claim 7, further comprising a compression step, of compressing the expanded image data for the segment to which it was judged in said judgment step that the expansion processing is to be performed in said expansion processing step before the transfer of the image data is started.

9. A method according to claim 6, further comprising:

a reception step, of receiving output data from a data processing apparatus; and a conversion step, of converting the received data into the printing data of a predetermined format.

10. A method according to claim 6, wherein the printing data of the predetermined format is intermediate data of a format classified for each segment.

11. A storage medium which stores a computer-readable program to control a printer, said program comprising:

code for an expansion processing step, of expanding, using plural expansion processing means, printing data of a predetermined format to image data of a format to be output to a printer, wherein the output to the printer is performed on a segment basis;

code for a calculation step, of calculating, before the expansion processing is performed by the plural expansion processing means, a processing time necessary to expand the printing data to the image data for each segment; and code for a scheduling processing step, of scheduling the expansion processing for each segment by the plural expansion processing means, based on the processing time calculated in said calculation step, wherein each of the plural expansion processing means has band raster memory areas, independent of the other plural expansion processing means, to hold output images, and wherein said scheduling processing step includes checking a plurality of schedule patterns obtained by assigning each segment to each band raster memory area, specifying one of the plurality of schedule patterns that has the smallest number of temporary band rasters, and scheduling which segments should each of the plural expansion processing means perform the expansion process on.

12. A medium according to claim 11, wherein said program further includes code for a transfer step, of transferring the expanded image data to the printer, said scheduling processing step includes a judgment step, of judging, for each segment, based on the processing time calculated in said calculation step, whether or not the expansion processing is to be performed in said expansion processing step before the transfer of the image data is started.

13. A medium according to claim 12, wherein said program further includes code for a compression step, of compressing the expanded image data for the segment to which it was judged that the expansion processing is to be performed in said expansion processing step before the transfer of the image data is started.

14. A medium according to claim 11, wherein said program further includes:

code for a reception step, of receiving output data from a data processing apparatus; and code for a conversion step, of converting the received data into the printing data of a predetermined format.

15. A medium according to claim 11, wherein the printing data of the predetermined format is intermediate data of a format classified for each segment.

* * * * *

UNITED STATES PATENT AND TRADEMARK OFFICE
CERTIFICATE OF CORRECTION

| | |
|---|---|
| PATENT NO. | : 6,914,692 B1 |
| APPLICATION NO. | : 09/516111 |
| DATED | : July 5, 2005 |
| INVENTOR(S) | : Mitani |

It is certified that error appears in the above-identified patent and that said Letters Patent is hereby corrected as shown below:

COLUMN 4:
Line 37, "then," should read -- that, --; and
Line 49, "The, after" should read -- Then, --.

COLUMN 5:
Line 55, "an print-" should read -- a print- --.

COLUMN 6:
Line 29, "an" should read -- a --.

COLUMN 10:
Line 51, "the" should read -- an --.

COLUMN 13:
Line 25, "such the" should read -- such a --; and
Line 36, "such the" should read -- such a --.

COLUMN 14:
Line 29, "such the" should read -- such an --; and
Line 41, "such the" should read -- such a --.

COLUMN 16:
Line 16, "nay" should read -- may --;
Line 29, "ends," should read -- end, --; and
Line 63, "Such the" should read -- Such a --.

UNITED STATES PATENT AND TRADEMARK OFFICE
CERTIFICATE OF CORRECTION

PATENT NO. : 6,914,692 B1
APPLICATION NO. : 09/516111
DATED : July 5, 2005
INVENTOR(S) : Mitani It is certified that error appears in the above-identified patent and that said Letters Patent is hereby corrected as shown below:

COLUMN 17:
Line 36, "such the" should read -- such an --;
Line 40, "then," should read -- that, --; and
Line 55, "such the" should read -- the --.

COLUMN 19:
Line 41, "then," should read -- that, --.

COLUMN 20:
Line 39, "such the" should read -- such --.

COLUMN 22:
Line 14, "areas" should read -- area, --.

Signed and Sealed this

Nineteenth Day of September, 2006

JON W. DUDAS
*Director of the United States Patent and Trademark Office*